United States Patent
Reial et al.

(10) Patent No.: US 12,471,019 B2
(45) Date of Patent: Nov. 11, 2025

(54) CONTROL CHANNEL MONITORING IN A WIRELESS COMMUNICATION SYSTEM

(71) Applicant: Telefonaktiebolaget LM Ericsson (publ), Stockholm (SE)

(72) Inventors: Andres Reial, Lomma (SE); Sina Maleki, Malmö (SE); Ali Nader, Malmö (SE); Niklas Andgart, Södra Sandby (SE); Ilmiawan Shubhi, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 984 days.

(21) Appl. No.: 17/600,701

(22) PCT Filed: Apr. 2, 2020

(86) PCT No.: PCT/SE2020/050347
§ 371 (c)(1),
(2) Date: Oct. 1, 2021

(87) PCT Pub. No.: WO2020/204802
PCT Pub. Date: Oct. 8, 2020

(65) Prior Publication Data
US 2022/0191789 A1   Jun. 16, 2022

Related U.S. Application Data
(60) Provisional application No. 62/828,345, filed on Apr. 2, 2019.

(51) Int. Cl.
*H04W 52/02*   (2009.01)
*H04W 76/28*   (2018.01)
(52) U.S. Cl.
CPC ... *H04W 52/0216* (2013.01); *H04W 52/0258* (2013.01); *H04W 76/28* (2018.02)

(58) Field of Classification Search
CPC . H04W 76/28; H04W 52/0216; H04W 76/27; H04W 72/0446; H04W 24/08;
(Continued)

(56) References Cited

U.S. PATENT DOCUMENTS

| | | | |
|---|---|---|---|
| 2014/0376435 A1* | 12/2014 | Morioka | H04W 4/00 370/311 |
| 2020/0229100 A1* | 7/2020 | He | H04W 72/23 |

FOREIGN PATENT DOCUMENTS

| | | |
|---|---|---|
| CN | 102210109 A | 10/2011 |
| CN | 102273250 A | 12/2011 |

(Continued)

OTHER PUBLICATIONS

3GPP, "3GPP TS 38.211 V15.5.0", 3rd Generation Partnership Project; Technical Specification Group Radio Access Network; NR; Physical channels and modulation (Release 15), Mar. 2019, 1-96.
(Continued)

*Primary Examiner* — Khalid W Shaheed
(74) *Attorney, Agent, or Firm* — Murphy, Bilak & Homiller, PLLC

(57) ABSTRACT

During a first portion (20A) of an active time (20) of discontinuous reception (DRX) operation, a wireless device (14) monitors a control channel (18) using a first control channel monitoring configuration (22-1). During the active time (20), though, the wireless device (14) switches from the first control channel monitoring configuration (22-1) to a second control channel monitoring configuration (22-N). This switching may be triggered by occurrence of an event. During a second portion (2 OB) of the active time (20) occurring subsequent to the first portion (20A) and after this switching, then, the wireless device (14) monitors the control channel (18) using the second control channel monitoring configuration (22-N). The first portion (20A) of the
(Continued)

active time (20) and the second portion (2 OB) of the active time (20) may be included in the same DRX cycle.

35 Claims, 23 Drawing Sheets

(58) Field of Classification Search
CPC ..... H04W 24/10; H04W 68/02; H04W 72/20; H04W 74/0833; H04W 68/005; H04W 24/02
See application file for complete search history.

(56) References Cited

FOREIGN PATENT DOCUMENTS

| CN | 104469902 A | * | 3/2015 | ........ H04W 52/0216 |
|----|----|----|----|----|
| CN | 104956755 A | | 9/2015 | |
| EP | 2651165 A1 | * | 10/2013 | ........ H04W 52/0209 |
| WO | 2013169000 A1 | | 11/2013 | |
| WO | 2016064048 A1 | | 4/2016 | |
| WO | 2019029943 A1 | | 2/2019 | |

OTHER PUBLICATIONS

3GPP, "3rd Generation Partnership Project; Technical Specification Group Radio Access Network; NR; Physical channels and modulation (Release 15)", 3GPP TS 38.211 V15.2.0, Jun. 2018, 1-96.
3GPP, "3rd Generation Partnership Project; Technical Specification Group Radio Access Network; NR; Physical layer procedures for control (Release 15)", 3GPP TS 38.213 V15.4.0, Dec. 2018, 1-104.
3GPP, "3rd Generation Partnership Project; Technical Specification Group Radio Access Network; NR; Physical layer procedures for data (Release 15)", 3GPP TS 38.214 V15.4.0, Dec. 2018, 1-102.
CATT, "DL Physical Channel and Signal Design for NR-U Operations", 3GPP TSG RAN WG1 Meeting #93, R1- 1806315, Busan, Korea, May 21-25, 2018, 1-2.
Ericsson, "3GPP TSG-RAN WG1 Meeting #95, R1-1813456, Spokane, USA", Nov. 12-16, 2018, 1-6.
Ericsson, "DL signals and channels for NR-U", 3GPP TSG-RAN WG1 Meeting Ad Hoc 1901, R1-1900996, Taipei, Taiwan, Jan. 21-25, 2019, 1-8.
Ericsson, "DL signals and channels for NR-U", 3GPP TSG-RAN WG1 Meeting #96, R1-1902881, Athens, Greece, Feb. 25-Mar. 1, 2019, 1-7.
Ericsson, "DL signals and channels for NR-U", 3GPP TSG-RAN WG1 Meeting #96bis, R1-1904333, Xi'an, China, Apr. 8-12, 2019, 1-8.
Ericsson, "On DL signals and channels for NR-U", 3GPP TSG-RAN WG1 Meeting #94, R1-1809202, Göteborg, Sweden, Aug. 20-24, 2018, 1-6.
Ericsson, "On DL signals and channels for NR-U", 3GPP TSG-RAN WG1 Meeting #93, Tdoc R1-1806251, Busan, Korea, May 21-25, 2018, 1-4.
Ericsson, "On DL signals and channels for NR-U", 3GPP TSG-RAN WG1 Meeting #94bis, R1-1811299, Chengdu, China, Oct. 8-12, 2018, 1-6.
LG Electronics, "Discussions on triggering adaptation for UE power consumption", 3GPP TSG RAN WG1 Meeting #95, R1-1812588, Spokane, USA, Nov. 12-16, 2018, 1-7.
CATT, "Corrections on carrier aggregation and bandwidth part operation", 3GPP TSG RAN WG1#94, R1-1808381, Gothenburg, Sweden, Aug. 20-24, 2018, 1-16.
Ericsson, "Considerations about DCI-based PDCCH-skip", 3GPP TSG RAN WG 2#105bis, R2-1904143, Xi'an, China, Apr. 8-12, 2019, 1-4.
Ericsson, "DRX with short on-Duration and Wake-up signaling", 3GPP TSG RAN WG2#103, Tdoc R2-1811627, Resubmission of R2-1810058, Gothenburg, Sweden, Aug. 20-24, 2018, 1-5.
Ericsson, "Enhanced cDRX", 3GPP TSG RAN WG2#105bis, R2-1904146, Revision of R2-1901270, Xi'an, China, Apr. 8-12, 2019, 1-6.
Etri, "DL signals and channels for NR-U", 3GPP TSG RAN WG1#96b, R1-1904603, Xi'an, China, Apr. 8-12, 2019, 1-7.
Interdigital, Inc., "DL signals and channels for gNB initiated COT", 3GPP TSG RAN WG1#96, R1-1902585, Athens, Greece, Feb. 25-Mar. 1, 2019, 1-7.
Qualcomm Incorporated, "DL signals and channels for NR-U", 3GPP TSG RAN WG1 AH-1901, R1-1900871, Taipei, Taiwan, Jan. 21-Jan. 25, 2019, 1-11.

* cited by examiner

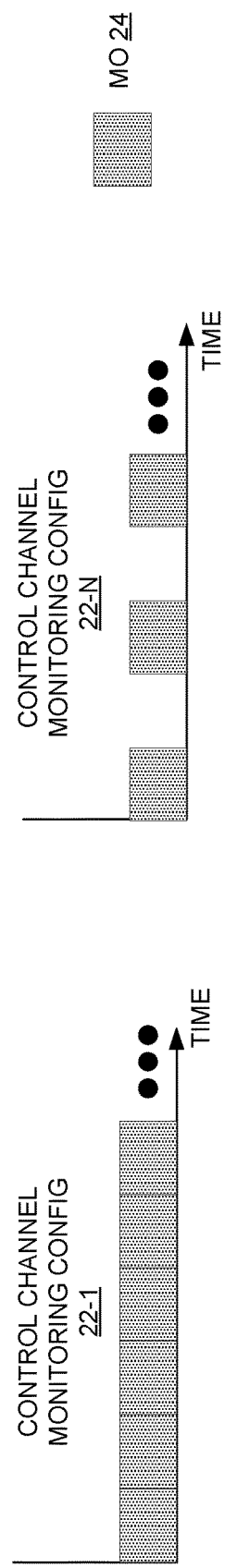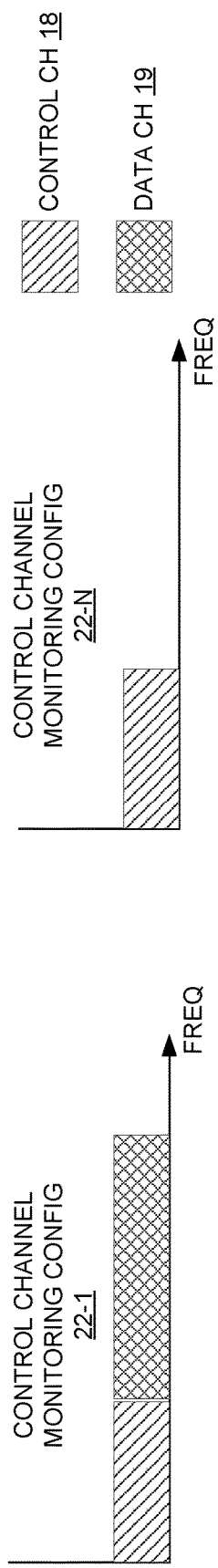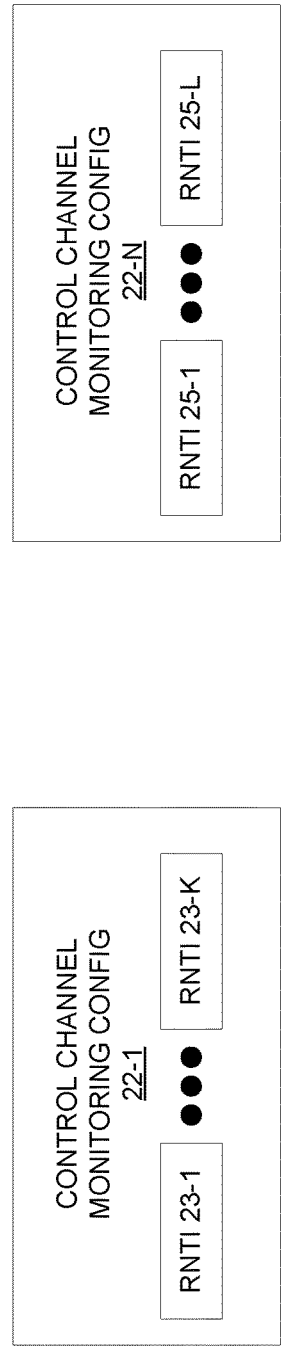
FIGURE 2A
FIGURE 2B
FIGURE 2C

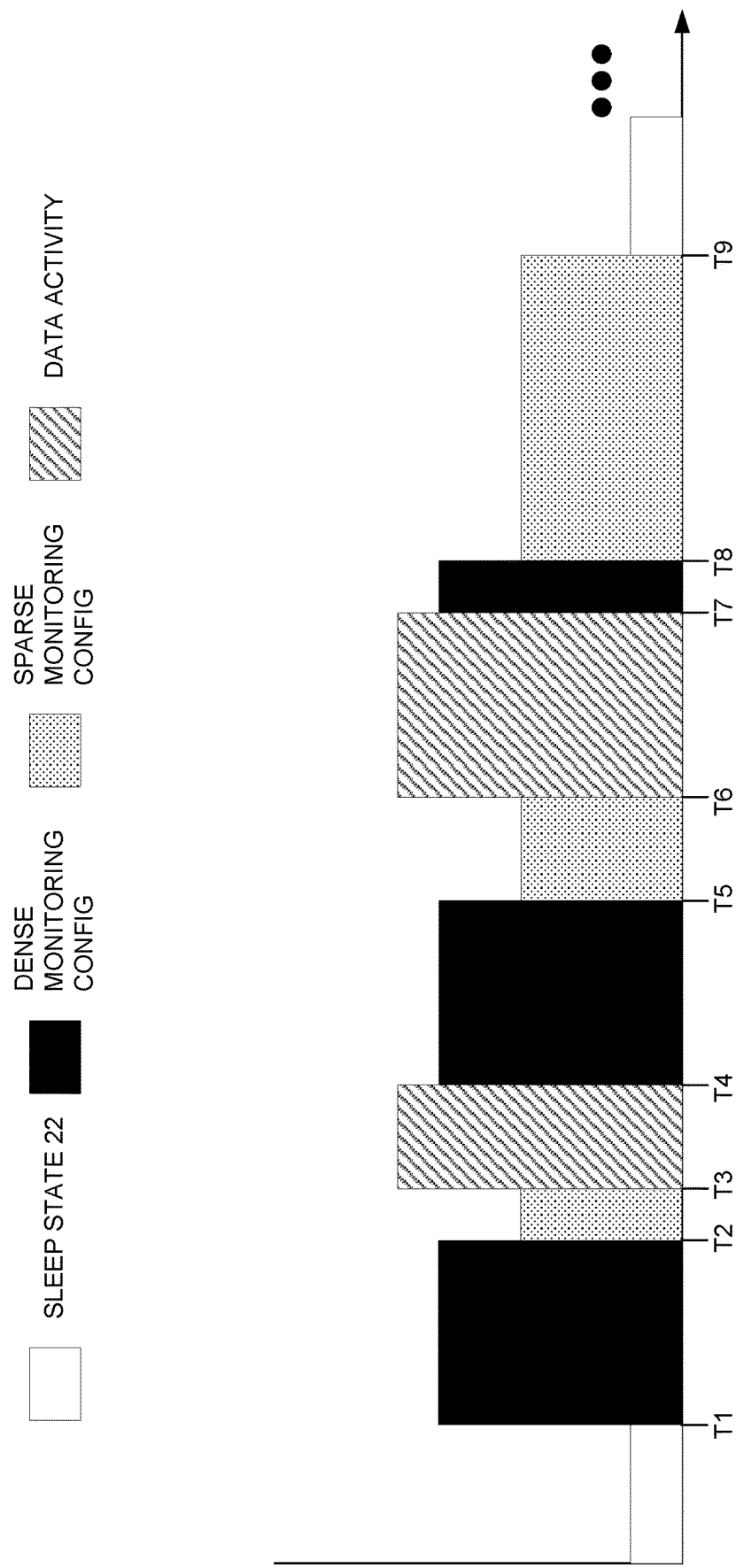

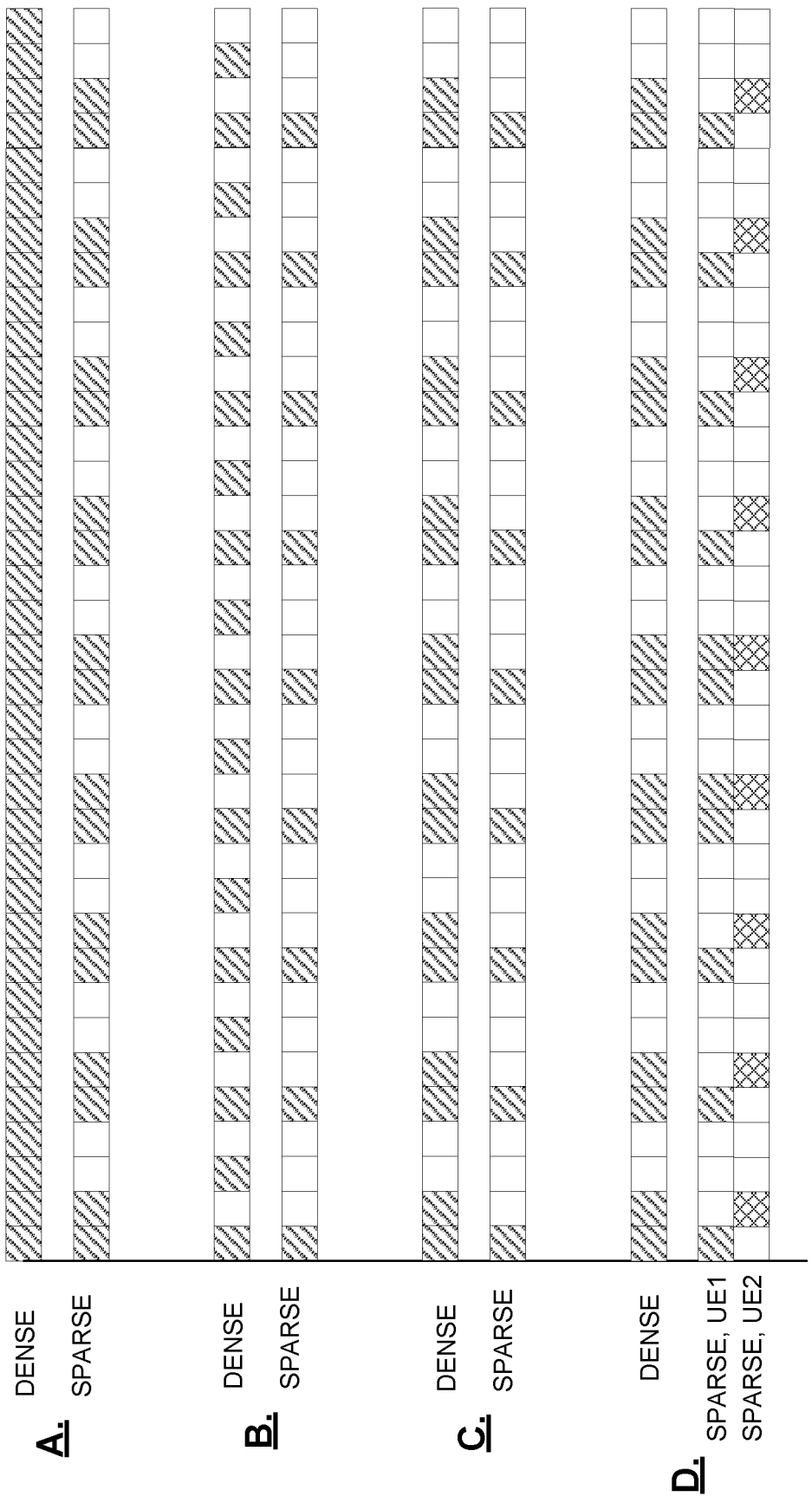

TRANSMITTING, FROM A NETWORK NODE TO A WIRELESS DEVICE, SIGNALING THAT INDICATES ONE OR MORE OF MULTIPLE DIFFERENT CONTROL CHANNEL MONITORING CONFIGURATIONS USABLE BY THE WIRELESS DEVICE FOR MONITORING THE CONTROL CHANNEL DURING THE ACTIVE TIME OF DRX OPERATION
700

TRANSMITTING, FROM A NETWORK NODE TO A WIRELESS DEVICE, SIGNALING THAT INDICATES WHICH OF MULTIPLE DIFFERENT CONTROL CHANNEL MONITORING CONFIGURATIONS THE WIRELESS DEVICE IS TO USE FOR MONITORING THE CONTROL CHANNEL DURING THE ACTIVE TIME OF DRX OPERATION
710

TRANSMITTING, FROM A NETWORK NODE TO A WIRELESS DEVICE, SIGNALING THAT CONFIGURES THE WIRELESS DEVICE TO SWITCH FROM MONITORING THE CONTROL CHANNEL DURING A FIRST PORTION OF AN ACTIVE TIME OF DRX OPERATION USING A FIRST CONTROL CHANNEL MONITORING CONFIGURATION TO MONITORING THE CONTROL CHANNEL DURING A SECOND PORTION OF THE ACTIVE TIME USING A SECOND CONTROL CHANNEL MONITORING CONFIGURATION
715

SCHEDULING TRANSMISSION OF A CONTROL MESSAGE ON THE CONTROL CHANNEL FOR A WIRELESS DEVICE, BASED ON WITH WHICH OF MULTIPLE DIFFERENT CONTROL CHANNEL MONITORING CONFIGURATIONS THE WIRELESS DEVICE IS MONITORING THE CONTROL CHANNEL DURING THE ACTIVE TIME OF DRX OPERATION
720

*FIGURE 7*

CONTROL CHANNEL MONITORING IN A WIRELESS COMMUNICATION SYSTEM

TECHNICAL FIELD

The present application relates generally to a wireless communication system, and relates more particularly to control channel monitoring in such a system.

BACKGROUND

After a wireless device establishes a radio connection (e.g., Radio Resource Control, RRC, connection) with a radio access network, the wireless device monitors a control channel (e.g., a Physical Downlink Control Channel, PDCCH) for control messages directed to the wireless device. The control messages may for instance convey scheduling information in the form of downlink assignments or uplink grants for allocating radio resources to the wireless device for downlink or uplink data transmission.

To reduce the amount of power that the wireless device consumes in monitoring the control channel, the network may configure the wireless device with discontinuous reception (DRX) functionality. When the wireless device is configured with DRX, the network limits the opportunities for transmitting a control message to the wireless device on the control channel to certain active time intervals. The wireless device then need only monitor the control channel during these active time intervals such that the device monitors the control channel discontinuously in time. Outside of the active time intervals, the wireless device can de-activate its receiver(s) or otherwise operate in a sleep state so as to conserve power.

Although DRX significantly reduces device power consumption, the wireless device still consumes meaningful power during active time intervals.

SUMMARY

Some embodiments herein exploit different control channel monitoring configurations that respectively configure different densities of monitoring occasions within which a wireless device is to monitor a control channel during an active time of DRX operation. In some embodiments, the network signals one or more of the different control channel monitoring configurations to the wireless device, e.g., in advance of the active time interval. Regardless, during an active time interval, the wireless device may switch between different control channel monitoring configurations, in order to monitor the control channel with different densities in time even within the active time interval. For example, during a first part of an active time interval, the wireless device may monitor the control channel during monitoring occasions that occur relatively densely in time, but the wireless device may switch to monitoring the control channel during monitoring occasions that occur relatively sparsely in time during a subsequent part of the active time interval. Some embodiments thereby reduce device power consumption even during active time intervals.

Switching between these monitoring configurations may be triggered by pre-defined events or by downlink control signalling. In either case, though, some embodiments advantageously incur little-to-no downlink control signalling to trigger monitoring configuration switching, so as to optimize device power consumption during active time intervals without the expense of meaningful signalling overhead.

More particularly, embodiments herein include a method performed by a wireless device. The method may comprise, during a first portion of an active time of discontinuous reception, DRX, operation, monitoring a control channel using a first control channel monitoring configuration. The method may further comprise, during the active time, switching from the first control channel monitoring configuration to a second control channel monitoring configuration, wherein said switching is triggered by occurrence of an event. The method may also comprise, during a second portion of the active time occurring subsequent to the first portion and after said switching, monitoring the control channel using the second control channel monitoring configuration. In some embodiments, the first portion of the active time and the second portion of the active time are each included in the same DRX cycle.

In some embodiments, the event is expiration of a timer. In one such embodiment, the event is expiration of the timer while an inactivity timer for DRX operation is running. The timer may for example be set to be shorter in duration than the inactivity timer. In some embodiments, the method may further comprise starting the timer when the wireless device starts monitoring the control channel using the first control channel monitoring configuration.

In embodiments where the event is expiration of a timer, the method may alternatively or additionally include receiving, from a network node, signaling indicating a value of the timer. In one such embodiment, the value of the timer indicates a duration for which the wireless device is permitted to monitor the control channel using the first control channel monitoring configuration and after which the wireless device is to switch to using the second control channel monitoring configuration.

Also in embodiments where the event is expiration of a timer, the method may alternatively or additionally further comprise, while monitoring the control channel using the first control channel monitoring configuration, monitoring for a command to switch to using the second control channel monitoring configuration. In this case, switching may comprise, responsive to the timer expiring without the wireless device having received the command, switching from the first control channel monitoring configuration to the second control channel monitoring configuration.

In some embodiments, the method further comprises monitoring for occurrence of the event. In one such embodiment, switching may comprise autonomously switching from monitoring the control channel using the first control channel monitoring configurations to monitoring the control channel using the second control channel monitoring configuration responsive to detecting occurrence of the event.

In some embodiments, the first and second control channel monitoring configurations respectively configure different densities of monitoring occasions within which the wireless device is to monitor the control channel during the active time of DRX operation.

In some embodiments, the first and second control channel monitoring configurations respectively configure the wireless device to monitor different frequencies, channels, frequency regions, or bandwidth parts.

In some embodiments, the first and second control channel monitoring configurations respectively configure different sets of identifiers with which the wireless device is to decode control messages received on the control channel during the active time of DRX operation.

In some embodiments, the different control channel monitoring configurations comprise different respective search space configurations.

In some embodiments, the control channel is a Physical Downlink Control Channel (PDCCH).

In some embodiments, said switching comprises autonomously switching from the first control channel monitoring configuration to the second control channel monitoring configuration.

In some embodiments, said event is either: receipt by the wireless device of scheduling information for scheduling uplink or downlink data; receipt by the wireless device of scheduling information for a channel state information measurement; switching by the wireless device between different stages of DRX operation; switching by the wireless device between different portions of the active time; or switching by the wireless device between different bandwidth parts.

In some embodiments, the method further comprises: during a third portion of the active time occurring before the first portion, monitoring the control channel using a third control channel monitoring configuration, wherein the first, second, and third portions of the active time are included in the same DRX cycle; and during the active time switching from the third control channel monitoring configuration to the first control channel monitoring configuration. In one such embodiment, said switching from the third control channel monitoring configuration to the first control channel monitoring configuration is triggered by an explicit switch command from a network node or is triggered by occurrence of another event. This other event can be expiration of a timer, or any other type of event described herein.

In some embodiments, the method further comprises receiving, from a network node, signaling that indicates at least one of the first and the second control channel monitoring configurations usable by the wireless device for monitoring the control channel during the active time.

In some embodiments, the method further comprises receiving, from a network node, signaling that configures the wireless device to, upon occurrence of the event, switch from monitoring the control channel during the first portion of the active time using the first control channel monitoring configuration to monitoring the control channel during the second portion of the active time using the second control channel monitoring configuration.

Embodiments herein also include a method performed by a network node. The method comprises transmitting, from the network node to a wireless device, signaling that configures the wireless device to, upon occurrence of an event, switch from monitoring a control channel during a first portion of an active time of discontinuous reception, DRX, operation using a first control channel monitoring configuration to monitoring the control channel during a second portion of the active time using a second control channel monitoring configuration. In some embodiments, the first portion of the active time and the second portion of the active time are each included in the same DRX cycle.

In some embodiments, said event is expiration of a timer, and the signaling configures the wireless device with a value of the timer. In one such embodiment, said event is expiration of the timer while an inactivity timer for DRX operation is running. For example, the timer may be set to be shorter in duration than the inactivity timer. In some embodiments, the timer is to be started when the wireless device starts monitoring the control channel using the first control channel monitoring configuration. In some embodiments, the signaling configures the wireless device with a value of the timer. For example, the value of the timer may indicate a duration for which the wireless device is permitted to monitor the control channel using the first control channel monitoring configuration and after which the wireless device is to switch to using the second control channel monitoring configuration.

In some embodiments, the first and second control channel monitoring configurations respectively configure different densities of monitoring occasions within which the wireless device is to monitor the control channel during the active time of DRX operation.

In some embodiments, the first and second control channel monitoring configurations respectively configure the wireless device to monitor different frequencies, channels, frequency regions, or bandwidth parts.

In some embodiments, the first and second control channel monitoring configurations respectively configure different sets of identifiers with which the wireless device is to decode control messages received on the control channel during the active time of DRX operation.

In some embodiments, the different control channel monitoring configurations comprise different respective search space configurations.

In some embodiments, the control channel is a Physical Downlink Control Channel (PDCCH).

In some embodiments, the signaling indicates at least one of the first and the second control channel monitoring configurations.

In some embodiments, the signaling configures the wireless device to, upon occurrence of the event, autonomously switch from monitoring the control channel during the first portion of the active time using the first control channel monitoring configuration to monitoring the control channel during the second portion of the active time using the second control channel monitoring configuration.

In some embodiments, said event is either: receipt by the wireless device of scheduling information for scheduling uplink or downlink data; receipt by the wireless device of scheduling information for a channel state information measurement; switching by the wireless device between different stages of DRX operation; switching by the wireless device between different portions of the active time; or switching by the wireless device between different bandwidth parts.

In some embodiments, the method further comprises transmitting, from the network node to the wireless device, an explicit switch command that commands the wireless device to switch from monitoring the control channel during a third portion of the active time using a third control channel monitoring configuration to monitoring the control channel during the first portion of the active time using the first control channel monitoring configuration. The first, second, and third portions of the active time may be included in the same DRX cycle. The third portion may occur before the first portion.

Embodiments herein also include corresponding apparatuses, computer programs, and carriers of those computer programs. For example, embodiments herein include a wireless device, e.g., comprising communication circuitry and processing circuitry. The wireless device is configured to, during a first portion of an active time of discontinuous reception, DRX, operation, monitor a control channel using a first control channel monitoring configuration. The wireless device may be further configured to, during the active time, switch from the first control channel monitoring configuration to a second control channel monitoring configuration, where this switch is triggered by occurrence of an event. The wireless device may also be configured to, during a second portion of the active time occurring subsequent to the first portion and after said switching, monitor the control channel using the second control channel monitoring configuration. In some embodiments, the first portion of the active time and the second portion of the active time are each included in the same DRX cycle.

Embodiments herein moreover include a network node, e.g., comprising communication circuitry and processing circuitry. The network node is configured to transmit, from the network node to a wireless device, signaling that configures the wireless device to, upon occurrence of an event, switch from monitoring a control channel during a first portion of an active time of discontinuous reception, DRX, operation using a first control channel monitoring configuration to monitoring the control channel during a second portion of the active time using a second control channel monitoring configuration. In some embodiments, the first portion of the active time and the second portion of the active time are each included in the same DRX cycle.

BRIEF DESCRIPTION OF THE DRAWINGS

FIG. 2A is a block diagram of different control channel monitoring configurations according to some embodiments.

FIG. 2B is a block diagram of different control channel monitoring configurations according to other embodiments.

FIG. 2C is a block diagram of different control channel monitoring configurations according to still other embodiments.

FIG. 4 is a block diagram of DRX operation using different control channel monitoring configurations according to some embodiments.

FIG. 5 is a block diagram of control channel monitoring configurations usable by different wireless devices according to some embodiments.

FIG. 7 is a logic flow diagram of a method performed by a network node according to some embodiments.

DETAILED DESCRIPTION

Figure 1A:
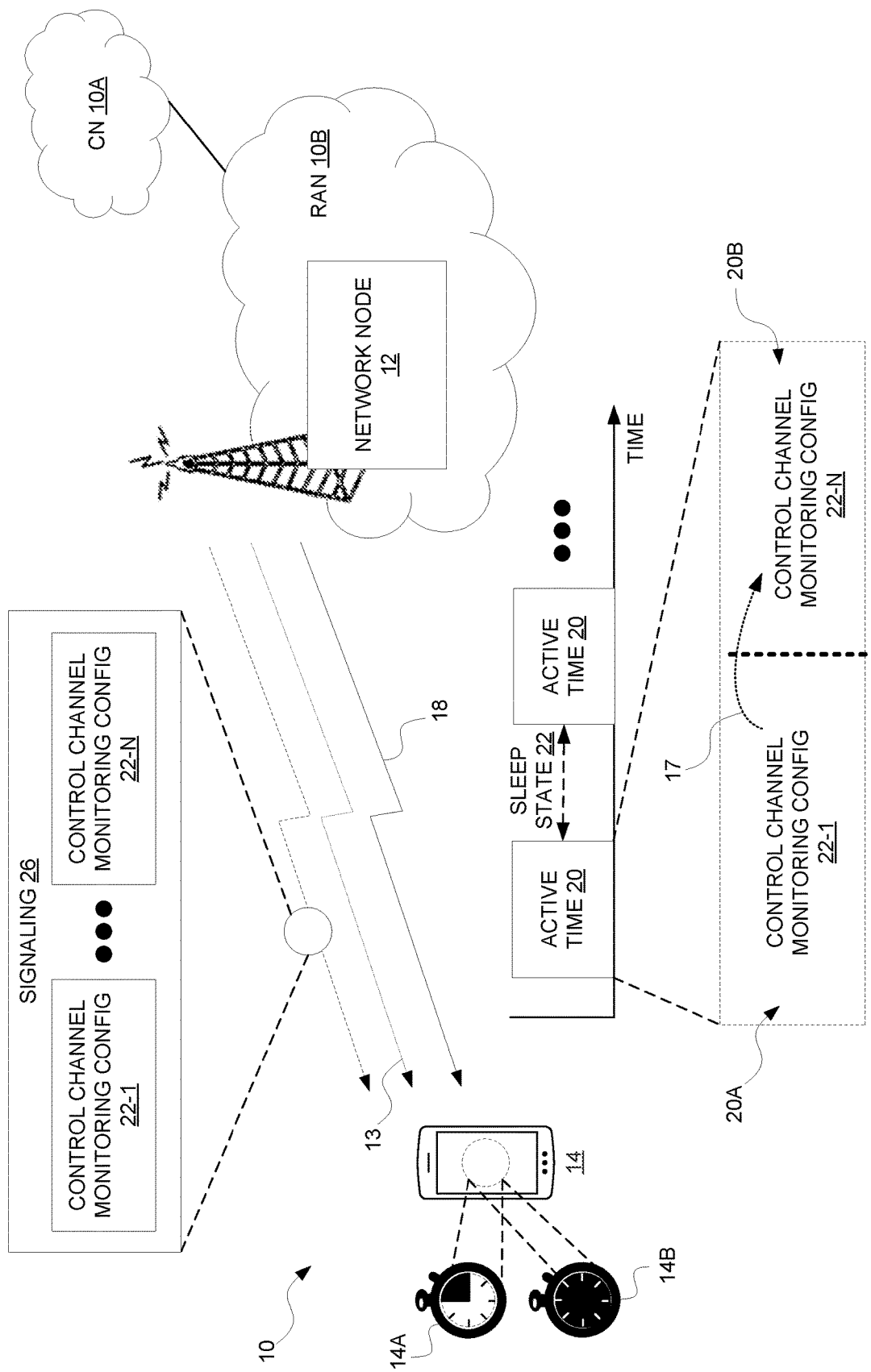
FIG. 1A is a block diagram of a wireless communication network according to some embodiments.

FIG. 1A shows a wireless communication network 10 (e.g., a 5G network) according to some embodiments. The network 10 includes a core network (CN) 10A (e.g., a 5G Core, 5GC) and a radio access network (RAN) 10B (e.g., a New Radio, NR, network). The RAN 10B includes one or more network nodes 12 (e.g., one or more base stations, such as one or more gNBs) for providing radio access to wireless devices (e.g., user equipments, UEs), one of which is shown as wireless device 14. Via this radio access, a wireless device 14 connects to the CN 10A, which in turn may provide the wireless device 14 with access to one or more external networks (not shown), such as the Internet.

The wireless device 14 is configured to monitor a control channel 18 (e.g., a Physical Downlink Control Channel, PDCCH) for control messages directed to the wireless device 14. The wireless device 14 may monitor this control channel 18, for instance, while the wireless device 14 is in a connected mode in which the wireless device has established a radio connection (e.g., a Radio Resource Control, RRC, connection) with the RAN 10B. In these and other cases, the control messages for which the wireless device 14 monitors the control channel 18 may include messages that convey scheduling information for the wireless device 14, e.g., in the form of downlink assignments or uplink grants that allocate radio resources to the wireless device 14 for downlink or uplink data transmission. Monitoring the control channel 18 may involve, for instance, the wireless device 14 (blindly) decoding any control messages received on the control channel 18 (e.g., using one or more radio network temporary identities, RNTIs, assigned to the wireless device 14) in order to determine whether the control messages are directed to the wireless device 14.

In some embodiments, the wireless device 14 may be configured (e.g., by RRC) with a discontinuous reception (DRX) functionality that controls the device's control channel monitoring activity, e.g., when in connected mode. When configured with DRX, the wireless device 14 monitors the control channel 18 discontinuously in time. As shown in this regard, the wireless device 14 generally monitors the control channel 18 during a so-called active time 20, which may periodically or occasionally recur. The wireless device 14 does not monitor the control channel 18 outside of this active time 20. Instead, outside of the active time 20, the wireless device 14 may operate in a sleep state 22, e.g., within which the wireless device 14 at least partially de-activates one or more receivers so as to conserve power.

Figure 1B:
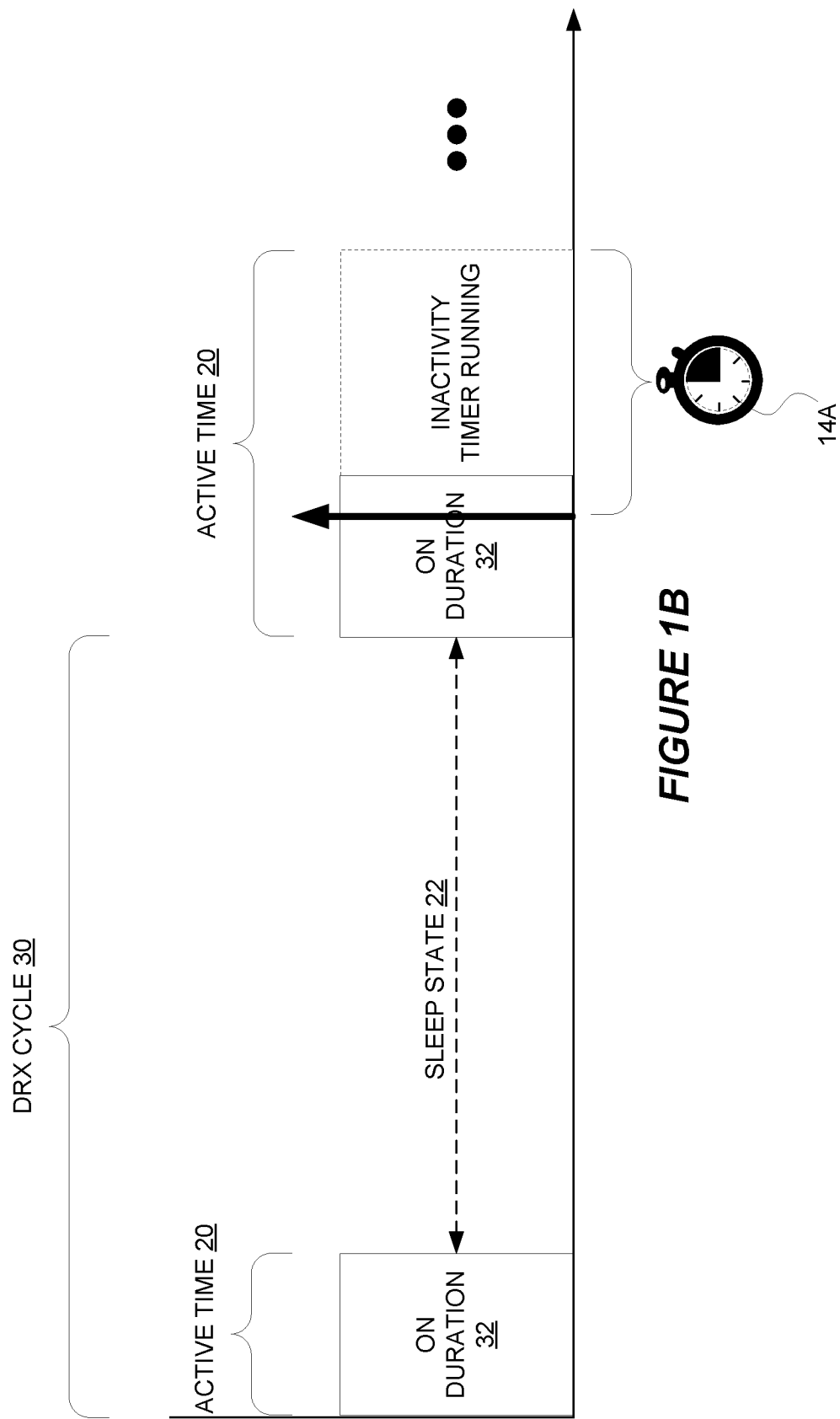
FIG. 1B is a block diagram of discontinuous reception, DRX, operation according to some embodiments.

FIG. 1B for instance shows one example of DRX operation according to some embodiments. As shown, DRX operates through the definition of a DRX cycle 30 that recurs periodically. Each DRX cycle 30 begins with an on-duration 32. Generally, the active time 20 includes at least the on-duration 32, meaning that the wireless device 14 monitors the control channel 18 to at least some extent during the on-duration 32. If the wireless device 14 receives a control message directed to the wireless device 18 on the control channel 18, the active time 20 may be extended beyond the on-duration 32 as shown in FIG. 1B. Specifically, when the wireless device 14 receives such a control message (e.g., indicating a new uplink or downlink transmission for the wireless device 14), the wireless device 14 starts an inactivity timer 14A. The active time 20 includes the interval of time over which the inactivity timer 14A continues to run. When the inactivity timer 14A expires, the active time 20 ends. Note though that receipt of a further control message while the inactivity timer 14A runs may restart the inactivity timer 14A so as to extend the active time 20 even further. After the active time 20 ends, the wireless device 14 may operate in a sleep state 22 as described above.

As this example demonstrates, then, the active time 20 may be defined according to any number of timers or criteria. In some embodiments, for example, the active time includes the time while an any of a set of one or more timers are running, e.g., an onDurationTimer defining the onDuration 32, an inactivityTimer as just described, a retransmissionTimerDL defining a maximum duration until a downlink retransmission is received, a retransmissionTimerUL defining a maximum duration until a grant for uplink retransmission is received, and/or a contentionResoutionTimer defining a maximum time limit for contention resolution in random access. Alternatively or additionally, the active time 20 may include the time while a scheduling request is sent on an uplink control channel and is pending. Alternatively or additionally, the active time 20 may include the time while a control channel indicating a new transmission addressed to an RNTI assigned to the wireless device 14 has not been received after successful reception of a random access response for a random access preamble not selected by the wireless device 14 among the contention-based random access preambles. Note, too, that the active time 20 in some embodiments may be prematurely stopped (e.g., even during the onDuration 32) by a command or other signalling from the network node 12 to the wireless device 14.

In any event, some embodiments herein notably exploit multiple different control channel monitoring configurations (config) 22-1 . . . 22-N for monitoring the control channel 18 during the active time 20 of DRX operation. The different control channel monitoring configurations 22-1 . . . 22-N may configure the wireless device 18 differently in terms of when or how the wireless device 18 is to monitor the control channel 18 during the active time 20 of DRX operation. In some embodiments, as shown in FIG. 2A, the different control channel monitoring configurations 22-1 . . . 22-N respectively configure different densities of monitoring occasions (MOs) 24 within which the wireless device 14 is to monitor the control channel 18. A monitoring occasion 24 in this sense may be any occasion in time during which the wireless device 14 is to monitor the control channel 18. As shown in FIG. 2A, for example, control channel monitoring configuration 22-1 (e.g., a "dense" configuration) configures monitoring occasions 24 to occur more densely in time than control channel monitoring configuration 22-N (e.g., a "sparse" configuration). For instance, monitoring configuration 22-1 may configure monitoring occasions 24 to occur each time slot, mini-slot, or other time unit, whereas monitoring configuration 22-N may configure monitoring occasions to occur every other time slot, mini-slot, or other time unit.

Alternatively or additionally, the different control channel monitoring configurations 22-1 . . . 22-N in other embodiments may respectively correspond to or dictate different receiver configurations at the wireless device 14. Different receiver configurations may for instance configure one or more receivers at the wireless device 14 differently in terms of which frequencies, channels, frequency regions, or bandwidth parts the receiver(s) receive, e.g., at any given time. For example, control channel monitoring configuration 22-1 may configure receiver(s) at the wireless device 14 to receive a greater number of frequencies, channels, frequency regions, or bandwidth parts at any given time than control channel monitoring configuration 22-N. For instance, as shown in FIG. 2B, control channel monitoring configuration 22-1 may permit same-slot scheduling so as to dictate that the receiver(s) at the wireless device 14 be configured to simultaneously receive the control channel 18 and a data channel 19. By contrast, control channel monitoring configuration 22-N may permit only cross-slot scheduling so as to allow the receiver(s) at the wireless device 14 to be configured to receive the control channel 18 without having to simultaneously receive the data channel 19.

In still other embodiments, the different control channel monitoring configurations 22-1 . . . 22-N may alternatively or additionally correspond to or dictate different sets of decoding configurations with which the wireless device 14 is to (blindly) attempt to decode control messages on the control channel 18. The different decoding configurations may for example have different sets of identifiers (e.g., RNTIs) with which the wireless device 14 is to (blindly) attempt to decode control messages on the control channel 18. The different sets of identifiers may be mutually exclusive or may be at least partly overlapping. In some embodiments, one of the configurations requires the wireless device 14 to attempt to decode a control message with a greater number of identifiers (e.g., RNTIs) than another one of the configurations. As shown in FIG. 2C, for example, control channel monitoring configuration 22-1 may require the wireless device 18 to attempt to decode a control message with each of K RNTIs 23-1 . . . 23-K, whereas control channel monitoring configuration 22-N may only require the wireless device 18 to attempt to decode a control message with each of L RNTIs 25-1 . . . 25-L, where K>L.

Regardless of the particular nature of the monitoring configurations 22-1 . . . 22-N, the wireless device 14 may monitor the control channel 18 according to different ones of the monitoring configurations 22-1 . . . 22-N during different respective portions, stages, or intervals of the active time 20 of DRX operation. Accordingly, during the active time 20 of DRX operation, the wireless device 14 may switch between different ones of the control channel monitoring configurations 22-1 . . . 22-N. As shown in FIG. 1A, for example, the wireless device 14 may monitor the control channel 18 using control channel monitoring configuration 22-1 during a first portion, stage, or interval 20A of the active time 20. During the active time 20, though, the wireless device 14 may perform a switch 17 to control channel monitoring configuration 22-N, in order to switch to monitoring the control channel 18 using control channel monitoring configuration 22-N during a subsequent portion, stage, or interval 20B of the active time 20. In some embodiments, as shown, the first portion, stage, or interval 20A of the active time 20 and the subsequent portion, stage, or interval 20B of the active time 20 are included in the same DRX cycle. That is, the first portion, stage, or interval 20A and the subsequent portion, stage, or interval 20B are included in the same active time interval.

Figure 3A:
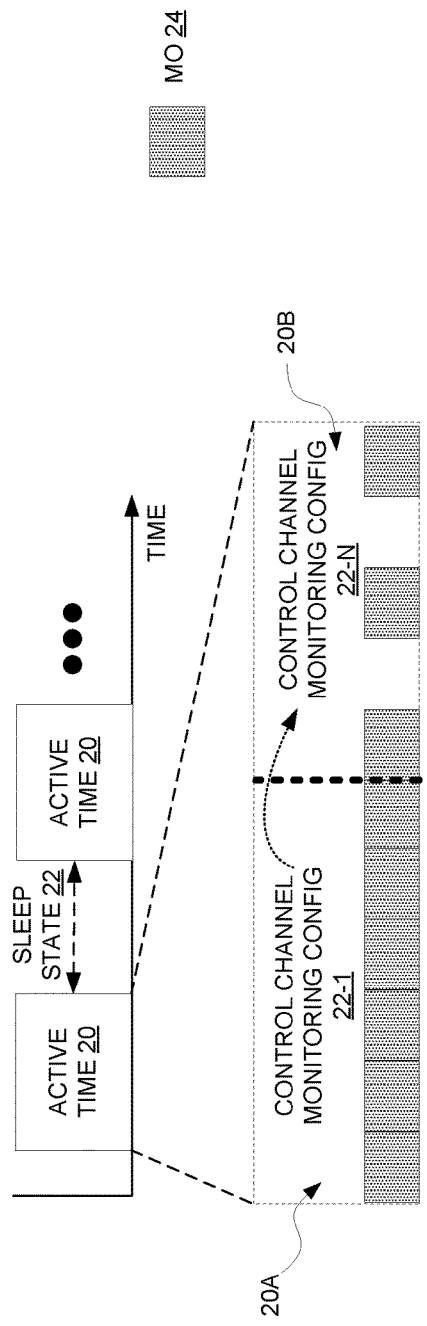
FIG. 3A is a block diagram of different control channel monitoring configurations being used in different portions of an active time interval of DRX operation according to some embodiments.
Figure 3B:
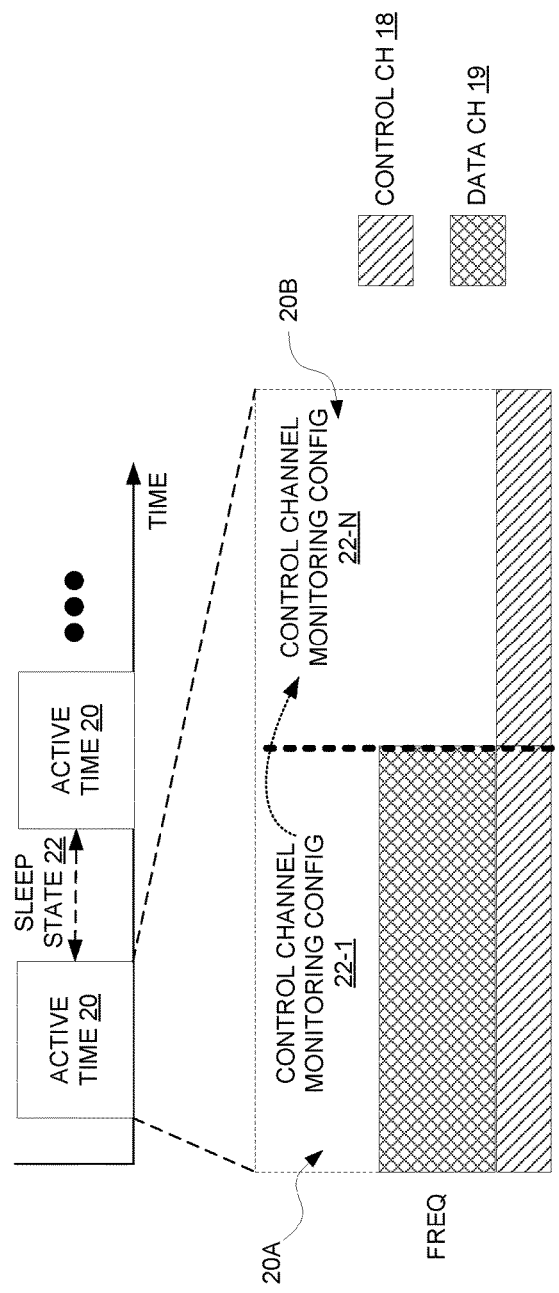
FIG. 3B is a block diagram of different control channel monitoring configurations being used in different portions of an active time interval of DRX operation according to other embodiments.

FIG. 3A shows one example where the monitoring configurations 22-1 . . . 22-N configure different densities of monitoring occasions 24 within which the wireless device 14 is to monitor the control channel 18. As shown, during a first portion, stage, or interval 20A of the active time 20, the wireless device 14 may monitor the control channel 18 according to monitoring configuration 22-1, so as to monitor the control channel 18 during monitoring occasions 24 that occur relatively densely in time. But the wireless device 18 may switch to monitoring the control channel 18 according to monitoring configuration 22-N during a subsequent portion, stage, or interval 20B of the active time 20, so as to monitor the control channel 18 during monitoring occasions 24 that occur more sparsely in time.

FIG. 2B shows a different example where the monitoring configurations 22-1 . . . 22-N alternatively or additionally configure one or more receivers at the wireless device 14 differently in terms of which frequencies, channels, frequency regions, or bandwidth parts the receiver(s) receive. As shown, during a first portion, stage, or interval 20A of the active time 20, the wireless device 14 may monitor the control channel 18 according to monitoring configuration 22-1, so as to simultaneously receive the control channel 18 and the data channel 19 (e.g., to account for same-slot scheduling). But the wireless device 18 may switch to monitoring the control channel 18 according to monitoring configuration 22-N during a subsequent portion, stage, or interval 20B of the active time 20, so as to only receive the control channel 18, not the data channel 19 (e.g., to exploit same-slot scheduling being prohibited according to the configuration 22-N).

In any event, using different ones of the monitoring configurations 22-1 . . . 22-N during different portions, stages, or intervals of the active time 20 may advantageously reduce or otherwise optimize device power consumption during that active time 20. In some embodiments, for example, different ones of the monitoring configurations 22-1 . . . 22-N consume different amounts of power at the wireless device 14. In this case, then, the wireless device 14 may switch from using one configuration during the active time 20 to using a different configuration that consumes less power, as needed or appropriate in order to reduce device power consumption during the active time 20. For example, during the active time 20, the wireless device 14 may switch to a monitoring configuration that configures more sparse monitoring occasions 24, so that outside of the monitoring occasions 24 the wireless device 14 may refrain from monitoring the control channel 14 and/or operate in the sleep state 22 or a different (e.g., lighter) sleep state even during that active time 20.

As shown in FIG. 1A, network node 12 in some embodiments signals one or more of the different control channel monitoring configurations 22-1 . . . 22-N to the wireless device 14, e.g., as part of DRX configuration and/or in advance of active time 20. As shown, for example, the network node 12 transmits signalling 26 to the wireless device 14, e.g., in the form of a higher-layer message such as an RRC message that may be transmitted during RRC configuration/reconfiguration. The signalling 26 indicates one or more of the control channel monitoring configurations 22-1 . . . 22-N, e.g., as being usable by the wireless device 14 for monitoring the control channel 18 during active time 20 of DRX operation. In some embodiments, for instance, the signalling 26 indicates each of the control channel monitoring configurations 22-1 . . . 22-N. In other embodiments, though, the signalling 26 indicates only one or some of the control channel monitoring configurations 22-1 . . . 22-N. The signalling 26 may for example not indicate a (trivial or default) monitoring configuration (e.g., configuration 22-1) such as a configuration that configures monitoring occasions 24 to occur continuously (e.g., every slot). At least one of the monitoring configurations 22-1 . . . 22-N in these and other cases may be predefined. In fact, in alternative embodiments, each of the monitoring configurations 22-1 . . . 22-N is predefined and need not be signalled.

Whether the configurations 22-1 . . . 22-N are signalled or predefined, the configurations 22-1 . . . 22-N in some embodiments may each be specified in terms of a set of one or more parameters, e.g., that define when and/or how the wireless device 14 is to monitor the control channel 18. Where the control channel 18 is a PDCCH, for example, the one or more parameters may include a search space (SS) configuration, e.g., a Control Region Set (CORESET), a period, offset, PDCCH format, aggregation level (AL), and/or blind decoding (BL) elements. The parameter(s) may alternatively or additionally include a cross-slot or same-slot configuration (e.g., a time domain resource allocation, TDRA, table), mode switching signalling, and/or other transition parameters.

Regardless of how the monitoring configurations 22-1 . . . 22-N are specified or provided at the wireless device 14, switching between the monitoring configurations 22-1 . . . 22-N during the active time 20 may be triggered in any number of ways. In some embodiments, the network node 12 transmits signalling 13 to the wireless device 14 (e.g., during the active time 20), in order to (dynamically) trigger the wireless device 14 to switch to a different monitoring configuration. This "trigger" signalling 13 may constitute dynamic signalling at a relatively lower protocol layer, such as the physical layer or Medium Access Control (MAC) layer, or signalling that is otherwise lightweight and/or fast. In one particular embodiment, then, the network node 12 uses RRC signalling (i.e., on a semi-static basis) to indicate one or more of the monitoring configurations 22-1 . . . 22-N to the wireless device and uses physical layer or MAC layer signalling (i.e., on a dynamic basis) to trigger the wireless device 18 to switch between the monitoring configurations 22-1 . . . 22-N. In these and other embodiments, the RRC signalling may semi-statically "configure" the wireless device 18 with the monitoring configurations 22-1 . . . 22-N whereas the physical layer or MAC layer signalling may dynamically "activate" one of the monitoring configurations 22-1 . . . 22-N that the wireless device 18 is configured with. Alternatively or additionally, each monitoring configuration 22-1 . . . 22-N may be mapped to or otherwise associated with a configuration index. The trigger signalling 13 in this case may simply and efficiently specify a configuration index of the monitoring configuration to which the wireless device 18 is to switch.

In one embodiment, the network node 12 uses Downlink Control Information (DCI) based signalling to trigger the wireless device 18 to switch to one or more of the monitoring configurations 22-1 . . . 22-N that have been configured via RRC. For example, a DCI message may be transmitted by the network node 12 to indicate a configuration index of a monitoring configuration to which the wireless device 18 is to switch. Upon receiving the index, the wireless device 18 may use the corresponding entry in its mapping or association between configuration indices and monitoring configurations 22-1 ... 22-N previously configured via RRC. The DCI message in some embodiments may use existing DCI formats (e.g., 1-0 or 1-1) where a scheduling information field may be reused for configuration indication purposes and/or reserved bits may be used. Alternatively, a newly specified DCI format can be used to accommodate the configuration switch with better efficiency/compactness and/or higher reliability than the PDCCH. In some embodiments, different types of DCI messages are used to trigger a switch to different ones of the monitoring configurations 22-1 ... 22-N. For example, a non-scheduling DCI message may trigger a switch to one or more certain configurations 22-1 ... 22-N (e.g., a "sparse" configuration), whereas a scheduling DCI message may trigger a switch to one or more others of the configurations 22-1 ... 22-N (e.g., a "dense" configuration). In this case, the non-scheduling DCI message may indicate the index of the monitoring configuration to which the wireless device 18 is to switch, while the scheduling DCI message may implicitly indicate that the wireless device 18 is to switch to a certain one of the configurations (e.g., a "dense" configuration) without having to indicate the configuration's index. Alternatively, the scheduling DCI message may use additional bits (e.g., reserved bits) to indicate which monitoring configuration should be invoked. In still other embodiments, uplink or downlink data, or a Channel State Information (CSI) measurement, may be used to trigger the switch to the certain one of the configurations instead of a scheduling DCI message.

In another embodiment, the network node 12 may transmit a MAC Control Element (CE) to trigger the wireless device 18 to switch to a different monitoring configuration. The MAC CE may for instance indicate the target monitoring configuration (e.g., via the configuration's index). Reserved MAC CE fields may be used for this. In some embodiments, the wireless device 18 may transmit an acknowledgement to the network node 12 acknowledging reception of the MAC CE.

In still other embodiments, other types of physical layer (i.e., Layer 1, L1) indicators may be used to trigger switching between monitoring configurations. These other types of physical layer indicators may include, for example, a predetermined reference signal (RS) sequence, receipt of PDCCH in one or more certain CORESETs, receipt of a PDCCH based on a specific RNTI, or the like.

In yet other embodiments, signalling 13 for triggering switching between monitoring configurations (e.g., that have different search space, SS, periodicities) is bundled with a change in another parameter, configuration, or setting. For example, if a scheduling DCI indicates a change in bandwidth part (BWP), the scheduling DCI may explicitly or implicitly also indicate a change in monitoring configuration to be used. As another example, if the scheduling DCI indicates a change in spatial domain characteristics such as a change in a number of transmission layers (i.e., transmission rank), the scheduling DCI may explicitly or implicitly also indicate a change in monitoring configuration to be used. As yet another example, a change in a Secondary cell (SCell) activation or deactivation may explicitly or implicitly also indicate a change in monitoring configuration to be used.

No matter the particular way signalling 13 from the network node 12 triggers monitoring configuration switching at the wireless device 14, the network node 12 in some embodiments may determine whether to transmit the signalling 13 to the wireless device 14 to trigger switching between monitoring configurations, based on any sort of information available to the network node 12. The determination may be based for instance on information that indicates or suggests whether scheduling information will be transmitted to the wireless device 14 within the near future. Such information may include for instance downlink buffer status, buffer status reports from the wireless device 14, traffic statistics, application-level information, scheduler information (e.g., round-robin scheduling delays), or the like. In these and other cases, then, the network node 12 may configure the wireless device 14 to switch to a less-power consuming monitoring configuration if the information indicates or suggests that no scheduling information will be transmitted to the wireless device 14 within the near future, e.g., as defined by a time duration threshold.

As these examples demonstrate, then, some embodiments allow relatively rapid transitions between different monitoring configurations 22-1 ... 22-N, by providing the configurations 22-1 ... 22-N to the wireless device 18 in advance and triggering transitions between the configuration with signalling that has low delay and low overhead.

In other embodiments, alternatively or additionally to signalling that triggers a switch between monitoring configurations, such a switch may be triggered based on the occurrence of any of one or more certain events, which may be pre-defined events. In this case, the wireless device 18 may monitor for and detect the occurrence of any of one or more certain events, and responsive to detecting such occurrence may autonomously switch to a certain one of the monitoring configurations 22-1 ... 22-N. The switch to a certain one of the monitoring configurations 22-1 ... 22-N is autonomous in the sense that the wireless device 18 performs the switch without being explicitly commanded to do so at a particular time via signaling from the network node 12. Accordingly, the switch may still be autonomous even if the network node 12 configures or otherwise controls the certain event(s) whose occurrence will eventually trigger the wireless device 18 to switch between monitoring configurations. Indeed, in that case, the signaling from the network node 12 simply configures the certain event(s) and is not an explicit command to perform the switch at a certain time.

With this understanding, the one or more certain events may include, for example, receipt of scheduling information (e.g., scheduling DCI on PDCCH) for scheduling uplink or downlink data, receipt of scheduling information for a CSI measurement, expiration of a certain timer 14B (e.g., a "no-data" timer as used in some examples), switching between different portions, intervals, or stages of DRX operation or of active time 20, and/or switching between different BWPs.

In some embodiments, for instance, receipt of scheduling information for scheduling data, receipt of scheduling information for a CSI measurement, and/or the beginning of the onDuration 32 may trigger the wireless device 14 to monitor the control channel 18 using a certain one of the monitoring configurations 22-1 ... 22-N, e.g., a "dense" configuration. This may be done for instance in anticipation of data or other activity. When a certain timer 14B expires, however, that timer's expiry triggers the wireless device 14 to switch to monitoring the control channel 18 using a different one of the monitoring configurations 22-1 ... 22-N, e.g., a "spares" configuration. In this case, further levels of timers may be implemented to trigger transition to successively sparser monitoring configurations, e.g., if no scheduling/data is received.

FIG. 4 shows an example where the beginning of the onDuration 32 or the receipt of scheduling information for scheduling data triggers the wireless device 14 to use a "dense" monitoring configuration (that configures monitoring occasions 24 to occur relatively densely in time), but the expiration of a no-data timer 14B triggers the wireless device 14 to use a "sparse" monitoring configuration (that configures monitoring occasions 24 to occur relatively sparely in time). In this example, the wireless device 14 has been previously configured via RRC with the sparse monitoring configuration and the dense monitoring configuration. As shown, the wireless device 14 emerges from a sleep state 22 at time T1 when the onDuration 32 of the DRX cycle begins. The beginning of the onDuration 32 and/or detection of scheduling information for scheduling data (e.g., scheduling PDCCH) triggers the wireless device 14 to autonomously switch to using the dense monitoring configuration to monitor the control channel 18. The wireless device 14 starts a no-data timer 14B at time T1, e.g., whose duration is specified as part of the dense monitoring configuration. The wireless device 14 remains in the dense monitoring configuration for the duration of the no-data timer 14B. Without any new data arriving since the start of the no-data timer 14B at time T1, the no-data timer 14B expires at time T2. This timer expiry triggers the wireless device 14 to autonomously switch to monitoring the control channel 18 using the sparse monitoring configuration, e.g., for more energy-efficient monitoring. The wireless device 14 remains in the sparse monitoring configuration until either the inactivity timer 14A expires or new data is scheduled/arrives. In this example, the wireless device 14 remains in the sparse monitoring configuration until time T3, when new data is scheduled. This scheduling of new data triggers the wireless device 14 to autonomously revert back to the dense monitoring configuration. When the data/scheduling activity ends at time T4, the wireless device 14 starts the no-data timer 14B and the inactivity timer 14A. The no-data timer 14B expires at time T5, triggering the wireless device 14 to switch from the dense monitoring configuration to the sparse monitoring configuration. At time T6, though, new data is scheduled again, which triggers the wireless device 4 to switch back to the dense monitoring configuration. When the data/scheduling activity ends at time T7, the wireless device 14 starts the no-data timer 14B and the inactivity timer 14A. While those timers are running, the wireless device 14 continues to use the dense monitoring configuration. In this example, though, the network node 12 transmits signalling 13 (e.g., explicit DCI signalling) at time T8 that triggers/commands the wireless device 14 to switch to using the sparse monitoring configuration. The wireless device 14 continues to use the sparse monitoring configuration until the inactivity timer 14A expires at time T9, at which point the active time 20 ends and the wireless device 14 operates in the sleep state 22.

Note that as this example demonstrates, the no-data timer 14B and the inactivity timer 14A may be set to have different durations. For example, the no-data timer 14B may be set to be shorter in duration than the inactivity timer 14A, e.g., to trigger the wireless device 14 to use a more power-efficiency monitoring configuration (e.g., a sparse monitoring configuration) during at least part of the time when the inactivity timer 14A is running. In some embodiments, the no-data timer 14B may be configured, e.g., dynamically or semi-statically. Where the no-data timer 14B is set to have a value equal to or exceeding that of the inactivity timer 14A, this may practically mean that the only way to trigger the wireless device 14 to switch monitoring configurations is by way of network signalling. This is because the larger no-data timer value will mean that the wireless device 14 switches to the sleep state 22 before being triggered to switch to a different monitoring configuration.

Similarly, in some embodiments, the no-data timer 14B and the onDuration timer that defines the onDuration 32 may be set to have the same or different values. In some embodiments, the no-data timer 14B and the onDuration timer have the same value. In these and other embodiments, then, the wireless device 14 may autonomously switch between the monitoring configurations 22-1 . . . 22-N when the onDuration 32 ends and/or the inactivity timer 14A starts.

As the above modifications and variations suggest, some embodiments advantageously incur little-to-no downlink control signalling to trigger monitoring configuration switching, so as to optimize device power consumption during active time intervals without the expense of meaningful signalling overhead.

Note that some embodiments operate as describe above at a Medium Access Control (MAC) entity level with regard to a control channel 18 in the form of a PDCCH. Specifically, when DRX is configured, the MAC entity of the wireless device 14 shall: if the MAC entity is in Active Time 20, monitor the PDCCH according to an activated one of the monitoring configurations 22-1 . . . 22-N.

Also note that the active time 20 according to some embodiments herein is a time interval during which the wireless device 14 monitors the control channel 18 according to one of the monitoring configurations 22-1 . . . 22-N, even if that monitoring configuration dictates discontinuous monitoring of the control channel 18 (e.g., according to sparsely occurring monitoring intervals 24) and even if the wireless device 14 operates in a (light) sleep state some of the time while using that monitoring configuration. In other embodiments not heretofore discussed, the active time may instead be limited to the time during which the wireless device 14 is continuously monitoring the control channel 18. In this case, for example, the monitoring configurations 22-1 . . . 22-N discussed herein that configure different densities of monitoring occasions 24 may effectively define different densities of active time corresponding to the monitoring occasions 24, e.g., such that the DRX cycle includes different intervals, stages, or portions that have different respective densities of active time. For instance, the onDuration portion of the DRX cycle may have dense (e.g., continuous) active time whereas the portion of the DRX cycle where the inactivity timer is running may have sparser active time.

Note further that, in embodiments that trigger configuration switching with network signalling 13, network-signaled transition to a monitoring configuration (e.g., a sparse monitoring configuration) may include time parameters (e.g., a number of slots) during which the wireless device can remain in that monitoring configuration and after which it returns to another monitoring configuration (e.g., a dense monitoring configuration). Note also that the network-signaling 13 has behaviour similarities with a Go-To-Sleep (GTS) signal, but has the benefit of not excluding the wireless device 14 from data scheduling opportunities until the next onDuration 32, only the next monitoring/search space occasion.

Similarly, the no-data timer based triggering in some embodiments may have behavioural characteristics with the inactivity timer 14A but also has the benefit of not excluding the wireless device 14 from data scheduling opportunities until the next onDuration 32, only the next monitoring/search space occasion.

Note further that the same procedure can also readily extend to the case with multiple SS periodicity situations where more than two SS periodicities are configured and network signaling or explicit signaling is used to switch between the monitoring configurations (also referred to as modes or monitoring modes).

Further, the values of the no-data timer 14B, as well as other parameters related to PDCCH monitoring, e.g. periodicity, can be determined in some embodiments by the network node 12 based on several types information that is available in the network, e.g. buffer status, scheduler occupancy, traffic arrival statistics, etc. It is also possible that the wireless device 14 assists the network node 12 with the wireless device's preferred configuration of those values, e.g. based on the running application. In this case, however, the network node 12 may remain the entity which decides whether those preferred values will be used or not.

The procedure described above can also be used in combination with wake-up signaling before or during the onDuration32. For example, unless a wake-up signal (WUS) is received, the wireless device 14 monitors the PDCCH with lower SS periodicity and moves to the dense monitoring configuration if WUS is received. Here, a WUS may be a signal specifically designed to wake-up the wireless device 14 from the sleep state 22. The WUS may for instance be a sequence detectable with a simple correlator. The WUS may alternatively or additionally be designed for detection by a dedicated wake-up receiver (WUR), which may be a receiver different from the receiver(s) with which the wireless device 14 receives the control channel 18.

Note also that the configuration of a sparse monitoring configuration as described in some embodiments may include a periodicity of a number of slots, and an indication of one or more slots that should be monitored within each period. The dense monitoring mode in some embodiments can correspond to monitoring each slot, but can also be configured with a periodicity and offset/pattern within the period. The duty-cycle of the monitored slots may be higher in the dense mode than for the sparse. Recovery from misalignments, as discussed below, may be better if the dense and sparse monitoring occasions overlap, i.e., the sparse monitoring occasions are a subset of the dense monitoring configurations. On the contrary, when multiple wireless devices operate in sparse mode, there are not as many occasions to schedule each wireless device, and the blocking probability may increase. To limit the blocking probability, different wireless devices could be configured with non-overlapping sparse monitoring occasions. Which slot(s) to use within each period can either be configured over RRC, or be calculated as a function of the wireless device index or C-RNTI. FIG. 5 shows some examples. In this example, (A) shows dense monitoring occasions in every slot, and sparse monitoring occasions every second slot. (B) and (C) show dense and sparse monitoring occasions with different duty cycles, and overlapping slots. (D) shows non-overlapping sparse monitoring occasions for different wireless devices.

Note also that, instead of configuration with slots, configurations may be defined in terms of minislots, or other time units.

Figure 6:
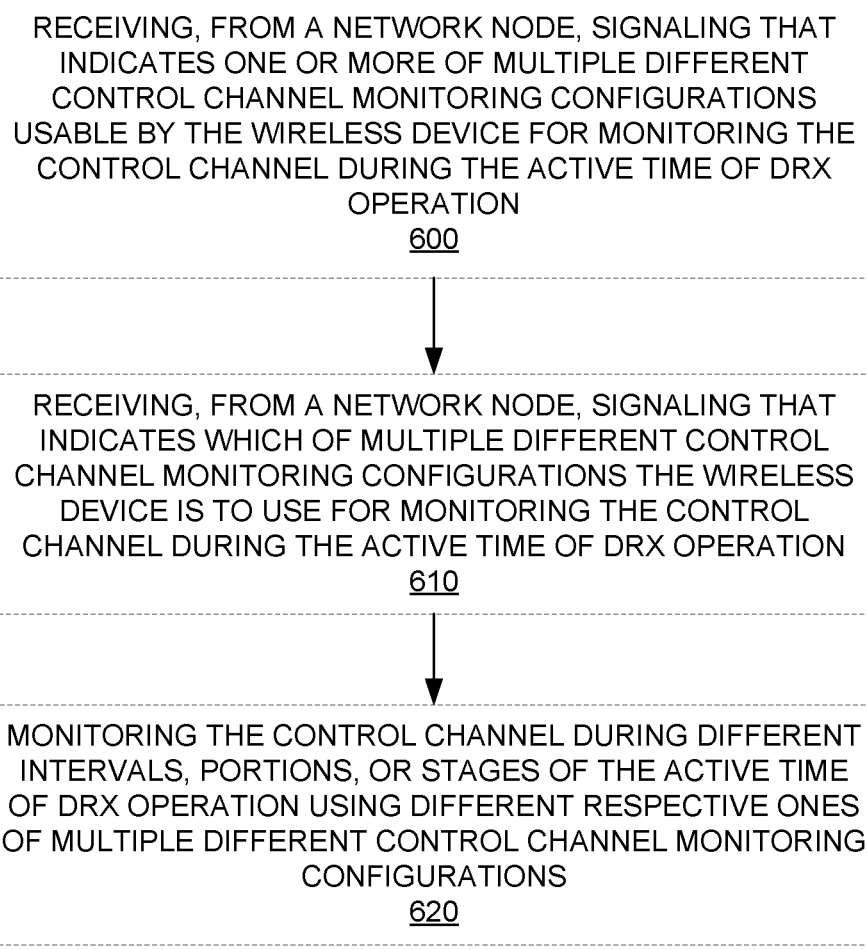
FIG. 6 is a logic flow diagram of a method performed by a wireless device according to some embodiments.

In view of the modifications and variations herein, FIG. 6 depicts a method performed by a wireless device 14 in accordance with particular embodiments. The method may include receiving, from a network node 12, signaling 26 that indicates one or more of multiple different control channel monitoring configurations 22-1 . . . 22-N, e.g., usable by the wireless device 14 for monitoring a control channel 18 during an active time 20 of discontinuous reception, DRX, operation (Block 600). The method may alternatively or additionally include receiving, from a network node 20, signaling 13 that indicates which of multiple different control channel monitoring configurations 22-1 . . . 22-N the wireless device 14 is to use for monitoring a control channel 18 during an active time 20 of discontinuous reception, DRX, operation (Block 610). Alternatively or additionally, the method may include monitoring a control channel 18 during different intervals, portions, or stages of an active time 20 of discontinuous reception, DRX, operation using different respective ones of multiple different control channel monitoring configurations 22-1 . . . 22-N.

In some embodiments, the different control channel monitoring configurations 22-1 . . . 22-N respectively configure different densities of monitoring occasions 24 within which the wireless device 14 is to monitor the control channel 18 during the active time 20 of DRX operation. Alternatively or additionally, the different control channel monitoring configurations 22-1 . . . 22-N respectively configure the wireless device 14 to monitor different frequencies, channels, frequency regions, or bandwidth parts. Alternatively or additionally, the different control channel monitoring configurations 22-1 . . . 22-N respectively configure different sets of identifiers (e.g., RNTIs) with which the wireless device 14 is to decode control messages received on the control channel 18 during the active time 20 of DRX operation.

Regardless, the method in some embodiments may include, during the active time 20, switching from monitoring the control channel 18 using one of the control channel monitoring configurations 22-1 . . . 22-N to monitoring the control channel 18 using a different one of the control channel monitoring configurations 22-1 . . . 22-N. This switching may be triggered by signaling 13 received from the network node 12 or by the occurrence of an event (e.g., expiration of a timer).

FIG. 7 depicts a method performed by a network node 12 in accordance with other particular embodiments. The method may include transmitting, from the network node 12 to a wireless device 14, signaling 26 that indicates one or more of multiple different control channel monitoring configurations 22-1 . . . 22-N, e.g., usable by the wireless device 14 for monitoring a control channel 18 during an active time 20 of discontinuous reception, DRX, operation (Block 700). Alternatively or additionally, the method may include transmitting, from the network node 12 to a wireless device 14, signaling 13 that indicates which of multiple different control channel monitoring configurations 22-1 . . . 22-N the wireless device 14 is to use for monitoring a control channel 18 during an active time 20 of discontinuous reception, DRX, operation (Block 710). Alternatively or additionally, the method may include transmitting, from the network node 12 to the wireless device 14, signaling that configures the wireless device 14 to switch from monitoring the control channel 18 during a first portion 20A of an active time (20) of discontinuous reception, DRX, operation using a first control channel monitoring configuration 22-1 to monitoring the control channel 18 during a second portion 20B of the active time 20 using a second control channel monitoring configuration (Block 715). Alternatively or additionally, the method may include scheduling transmission of a control message on a control channel 18 for a wireless device 14, based on with which of multiple different control channel monitoring configurations 22-1 . . . 22-N the wireless device 14 is monitoring the control channel 18 during an active time 20 of discontinuous reception, DRX, operation (Block 720).

In some embodiments, the different control channel monitoring configurations 22-1 . . . 22-N respectively configure different densities of monitoring occasions 24 within which the wireless device 14 is to monitor the control channel 18 during the active time 20 of DRX operation. Alternatively or additionally, the different control channel monitoring configurations 22-1 ... 22-N respectively configure the wireless device 14 to monitor different frequencies, channels, frequency regions, or bandwidth parts. Alternatively or additionally, the different control channel monitoring configurations 22-1 ... 22-N respectively configure different sets of identifiers (e.g., RNTIs) with which the wireless device 14 is to decode control messages received on the control channel 18 during the active time 20 of DRX operation.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
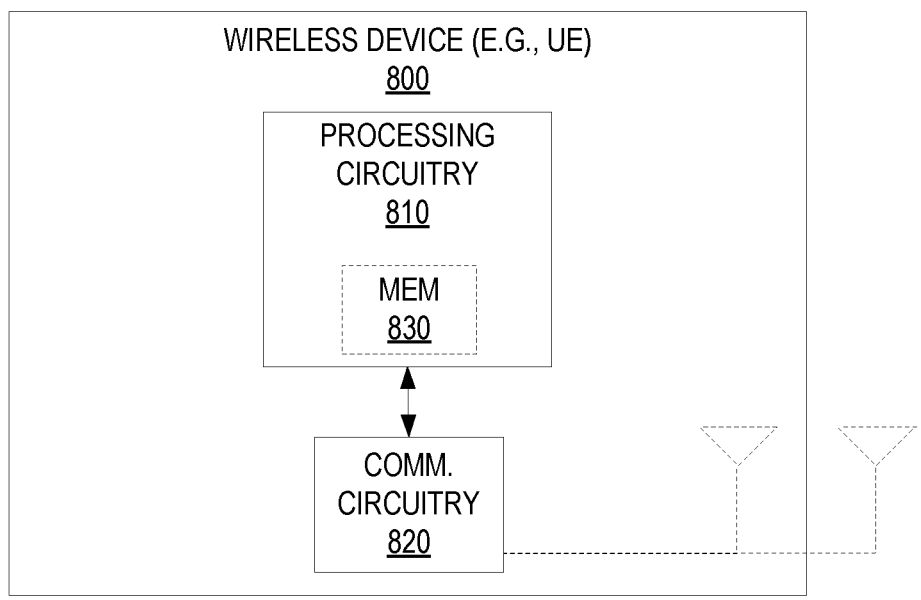
FIG. 8 is a block diagram of a wireless device according to some embodiments.

FIG. 8 for example illustrates a wireless device 800 (e.g., wireless device 14) as implemented in accordance with one or more embodiments. As shown, the wireless device 800 includes processing circuitry 810 and communication circuitry 820. The communication circuitry 820 (e.g., radio circuitry) is configured to transmit and/or receive information to and/or from one or more other nodes, e.g., via any communication technology. Such communication may occur via one or more antennas that are either internal or external to the wireless device 800. The processing circuitry 810 is configured to perform processing described above, such as by executing instructions stored in memory 830. The processing circuitry 810 in this regard may implement certain functional means, units, or modules.

Figure 9:
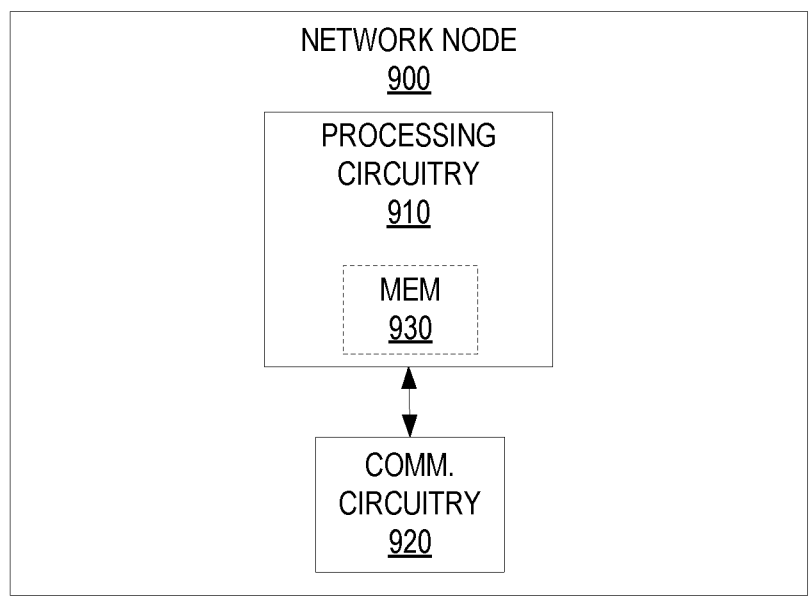
FIG. 9 is a block diagram of a network node according to some embodiments.

FIG. 9 illustrates a network node 900 (e.g., network node 12) as implemented in accordance with one or more embodiments. As shown, the network node 900 includes processing circuitry 910 and communication circuitry 920. The communication circuitry 920 is configured to transmit and/or receive information to and/or from one or more other nodes, e.g., via any communication technology. The processing circuitry 910 is configured to perform processing described above, such as by executing instructions stored in memory 930. The processing circuitry 910 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. In the below embodiments, the wireless device 14 may be exemplified as a user equipment (UE), network node 12 may be exemplified as a gNB or base station, control channel 18 may be exemplified as a PDCCH, and inactivity timer 14A may be exemplified as an Inactivity timer (IAT).

New radio (NR) standard in 3GPP is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

Figure 10:
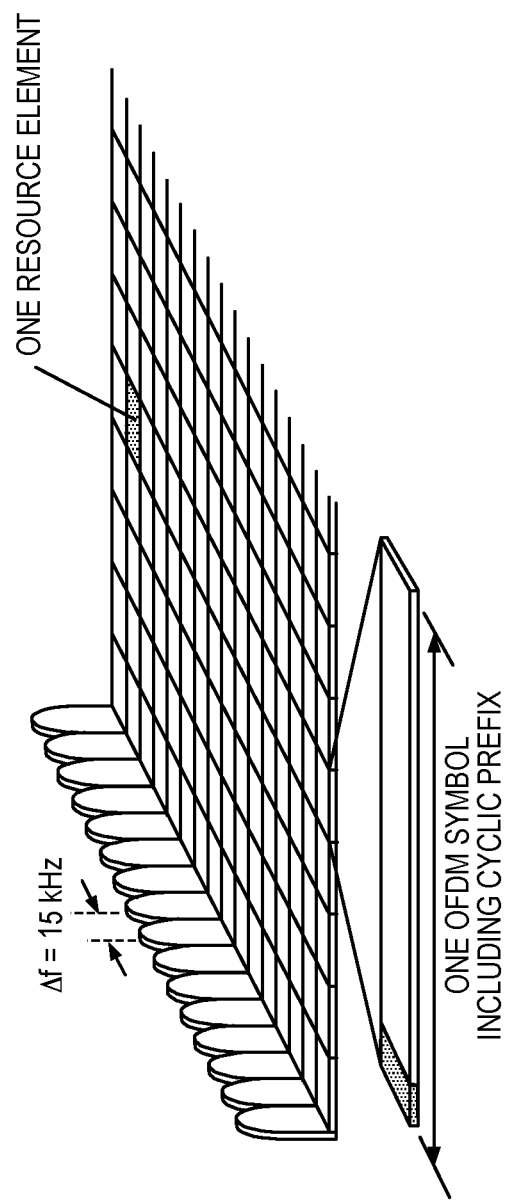
FIG. 10 is a block diagram of a resource block in a New Radio system according to some embodiments.

FIG. 10 shows an exemplary radio resource in New Radio (NR). One of the solutions for low latency data transmission is shorter transmission time intervals. In NR in addition to transmission in a slot, a mini-slot transmission is also allowed to reduce latency. A mini-slot may consist of any number of 1 to 14 OFDM symbols. It should be noted that the concepts of slot and mini-slot are not specific to a specific service meaning that a mini-slot may be used for either eMBB, URLLC, or other services.

In release 15 (Rel-15) NR, a user equipment (UE) can be configured with up to four carrier bandwidth parts (BWPs) in the downlink with a single downlink carrier bandwidth part being active at a given time. A UE can be configured with up to four carrier bandwidth parts in the uplink with a single uplink carrier bandwidth part being active at a given time. If a UE is configured with a supplementary uplink, the UE can additionally be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N_{BWB,i}^{size}-1$, where i is the index of the carrier bandwidth part. A resource block (RB) is defined as 12 consecutive subcarriers in the frequency domain.

Numerologies

Multiple orthogonal frequency-division multiplexing (OFDM) numerologies, $\mu$, are supported in NR as given by Table 1, where the subcarrier spacing, Δf, and the cyclic prefix for a carrier bandwidth part are configured by different higher layer parameters for downlink (DL) and uplink (UL), respectively.

TABLE 1

Supported transmission numerologies.

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Physical Channels

A downlink physical channel corresponds to a set of resource elements carrying information originating from higher layers. The following downlink physical channels are defined:
  Physical Downlink Shared Channel, PDSCH
  Physical Broadcast Channel, PBCH
  Physical Downlink Control Channel, PDCCH PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. The following uplink physical channels are defined:
  Physical Uplink Shared Channel, PUSCH
  Physical Uplink Control Channel, PUCCH
  Physical Random Access Channel, PRACH PUSCH is the uplink counterpart to the PDSCH. PUCCH is used by UEs to transmit uplink control information, including HARQ acknowledgements, channel state information reports, etc. PRACH is used for random access preamble transmission.

An example contents of a DL DCI 1-0 is shown below.
Example Contents of a DCI Format 1_0 with CRC Scrambled by C-RNTI/CS_RNTI
  Identifier for DCI formats—1 bits
    The value of this bit field is always set to 1, indicating a DL DCI format
  Frequency domain resource assignment—$\lceil \log_2(N_{RB}^{DL,BWP}(N_{RB}^{DL,BWP}+1)/2) \rceil$ bits
    $N_{RB}^{DL,BWP}$ is the size of the active DL bandwidth part in case DCI format 1_0 is monitored in the UE specific search space and satisfying
      the total number of different DCI sizes configured to monitor is no more than 4 for the cell, and
      the total number of different DCI sizes with C-RNTI configured to monitor is no more than 3 for the cell
    otherwise, $N_{RB}^{DL,BWP}$ is the size of CORESET 0.
  Time domain resource assignment—4 bits as defined in Subclause 5.1.2.1 of [6, TS 38.214]
  VRB-to-PRB mapping—1 bit according to Table 7.3.1.1.2-33
  Modulation and coding scheme—5 bits as defined in Subclause 5.1.3 of [6, TS 38.214]
  New data indicator—1 bit
  Redundancy version—2 bits as defined in Table 7.3.1.1.1-2
  HARQ process number—4 bits
  Downlink assignment index—2 bits as defined in Subclause 9.1.3 of [5, TS 38.213], as counter DAI
  TPC command for scheduled PUCCH—2 bits as defined in Subclause 7.2.1 of [5, TS 38.213]
  PUCCH resource indicator—3 bits as defined in Subclause 9.2.3 of [5, TS 38.213]
  PDSCH-to-HARQ_feedback timing indicator—3 bits as defined in Subclause 9.2.3 of [5, TS38.213]

Figure 11:
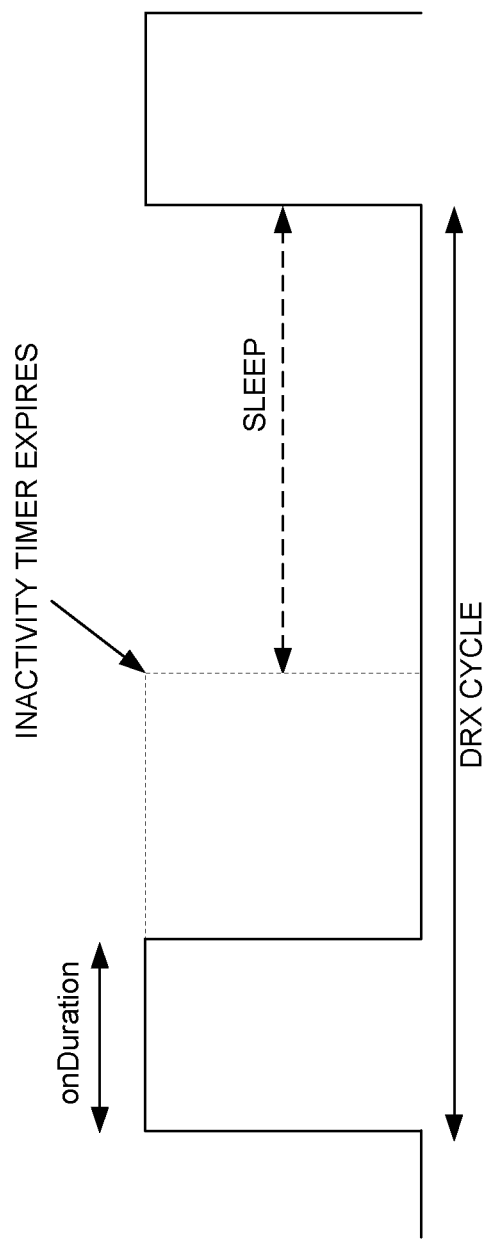
FIG. 11 is a block diagram of a DRX cycle according to some embodiments.

DRX (Discontinuous reception): As shown in simplified DRX operation in FIG. 11, DRX allows a UE to transition to a lower power state where it is not required to receive any transmission from the base station. There is an ON-duration where UE is awake and monitors for control channels, and if there is no control message detected by the UE, an Inactivity timer (IAT) begins, and the UE continues to monitor for control channel until a valid control message addressed to the UE is received or the inactivity timer expires. If the UE receives a valid control message, it extends the Inactivity timer and continues to monitor the PDCCH. If the inactivity timer expires then UE can stop receiving transmissions from base station (e.g. no control monitoring) until end of the DRX cycle. Typically, the DRX parameters are configured by RRC and there are some other DRX parameters including round-trip time (RTT) related, HARQ related, etc. OnDuration and the time duration when inactivity timer is running is also generally referred to as active time.

In summary the following terms are typically associated with DRX operation:

Active Time: Time related to DRX operation, during which the MAC entity monitors the PDCCH, e.g., according to one of the monitoring configuration 22-1 . . . 22-N.

DRX Cycle: Specifies the periodic repetition of the OnDuration followed by a possible period of inactivity (see FIG. 2 below).

Inactivity Timer (IAT): Generally, refers to the number of consecutive PDCCH-subframe(s)/slots after the subframe/slot in which a PDCCH indicates an initial UL, DL or SL user data transmission for a MAC entity.

MAC entity is the medium access control entity, and there is one MAC entity per configured cell group, for example the master cell group and secondary cell group.

One main aspect is that DRX functionality is configured by RRC, which is typically operating on a slower scale than MAC or Physical layer. Thus, the DRX parameter settings, etc. cannot be changed quite adaptively through RRC configuration, especially if the UE has a mix of traffic types.

UE Power Consumption

UE power consumption is an important metric that needs to be enhanced. In general, significant power can be spent on monitoring the PDCCH in LTE based on one DRX setting from LTE field logs. The situation can be similar in NR if similar DRX setting with traffic modelling is utilized, as the UE needs to perform blind detection in its configured control resource sets (CORESETs) to identify whether there is a PDCCH sent to it, and act accordingly. Techniques that can reduce unnecessary PDCCH monitoring or allowing UE to go to sleep or wake-up only when required can be beneficial.

A UE's main activity in RRC_CONNECTED mode is monitoring PDCCH for scheduled PDSCH/PUSCH. The UE needs to decode all PDCCH occasions/TF (Time-Frequency) locations/configurations according to a search space. After decoding according to each blind decoding (BD) option, the UE can check whether the PDCCH was meant to it, based on checking the CRC using its c-RNTI. If so, the UE follows the information within the DCI (DL Control Information) carried over the PDCCH.

Furthermore, PDCCH/DCI also informs the UE about the scheduling time offset values K0, K1, K2 and aperiodic-TriggeringOffset between the PDCCH and PxSCH and CSI-RS reception. In summary, K0, K1 and K2 can adopt values 0, 1, 2, . . . which shows the number of slot offset between the PDCCH and PDSCH, or PUCCH/PUSCH respectively. While K0 is related to scheduling DL PDSCH, K1 is related to HARQ ACK/NACK operations, and K2 shows the offset between PDCCH and PUCCH/PUSCH in the UL. On the other hand, aperiodicTriggeringOffset shows the offset to CSI-RS reception which can change also on the range 0,1,2,3,4.

On one hand, frequent (e.g. every slot) PDCCH monitoring occasions are desirable since this allows high data throughput (UE can be scheduled every slot) but also low latency (UE can be scheduled every slot). On the other hand, frequent PDCCH monitoring occasions without often being scheduled implies a lot of energy consumed for PDCCH decoding without actually being scheduled.

Since unlike LTE, in NR the scheduling offsets can be larger than zero. This gives the opportunity of cross-slot scheduling to the NW in addition to the self-slot scheduling. The opportunity of cross-slot scheduling may be used for power savings in the UE by adaptively changing the BWP between lower and upper ones, e.g. for PDCCH and PDSCH to reduce the power consumption.

Operation During Active Data Sessions

Figure 12:
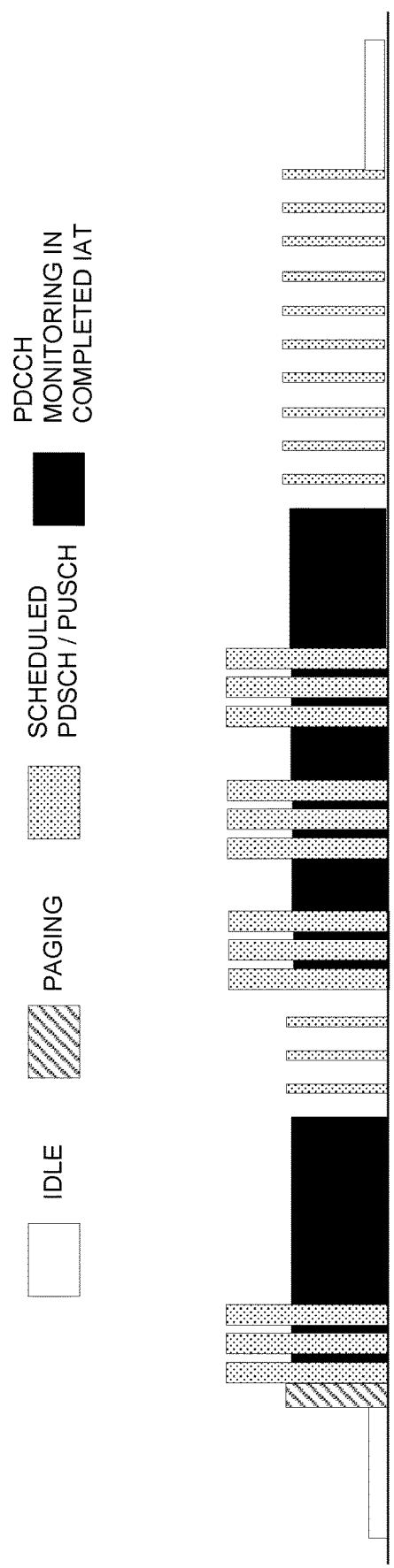
FIG. 12 is a block diagram of DRX operation which heretofore creates periods of continuous control channel monitoring until the inactivity timer expires.

The DRX extension during the ON-duration when data arrives, by virtue of starting the IAT, heretofore creates periods of continuous PDCCH monitoring until the IAT expires. When additional data arrives, the IAT is restarted. The relevant PDCCH monitoring segments are marked in FIG. 12. During the IAT, the UE monitors the PDCCH according to the current PDCCH search space (SS) and TDRA (Time Domain Resource Allocation) configuration. It shall be noted that within the context herein, the term TDRA is used for addressing K0, K1, K2, aperiodicTriggeringOffset even though the exact term in 3GPP might be different for the different offsets.

There currently exist certain challenge(s). UE energy consumption profiling over a representative range of UE operating modes and functions in realistic scenarios indicates that PDCCH monitoring during the IAT is a dominant cause of energy consumption in an eMBB NR UE radio.

During the IAT, the UE heretofore uses a previously configured PDCCH SS and cross-slot scheduling assumptions determined by entries provided in the TDRA. Typically, a temporally frequent SS (e.g. monitoring every slot) and TDRA allowing same-slot scheduling provide best performance by minimizing latency and maximizing the user-perceived throughput (UPT). Unfortunately, such configurations have heretofore led to the highest UE energy consumption since the UE heretofore has no sleep opportunities between the monitoring slots and cannot operate in a more power-efficient receiver mode since immediate PDSCH reception may be required if the received PDCCH points at k0=0. From a UE energy consumption viewpoint, it could be preferable to operate with a sparse SS and a TDRA that excludes same-slot scheduling, but this is not desirable for the network (NW) due to performance impact.

The SS and the TDRA are configured via RRC and cannot typically be rapidly changed. The choice of the SS and TDRA thus heretofore needs to be a compromise between UE energy efficiency and NW performance and it may generally not be possible to find a mutually satisfying combination.

One solution for reducing unnecessary PDCCH monitoring during the IAT would to be a PDCCH skipping approach where the UE may indicate to the UE to omit the monitoring during a number of slots using L1 signaling, e.g., DCI. The UE may then in the meantime enter a more energy-efficient power state, e.g. light sleep or micro-sleep. However, this does not necessarily provide universally positive trade-offs either. If the skipped time is long, any data arriving that interval is strongly delayed. If it is short, then during more extended periods without data during the IAT, many such skipping indications would need to be transmitted by the NW, leading to increased NW signaling load.

There is thus a need for an approach for reducing PDCCH monitoring-related energy consumption during the IAT without incurring large latency penalties when a new data burst arrives nor causing excessive additional signaling.

Certain aspects of the present disclosure and their embodiments may provide solutions to these or other challenges. In some embodiments, the UE is configured with at least two PDCCH monitoring configurations via RRC for operation during various states/periods of DRX, e.g., the IAT—these configurations may be referred to as a dense configuration (e.g., SS occasions every slot and same-slot scheduling permitted) and a sparse configuration (e.g., infrequent SS occasions and only cross-slot scheduling permitted). Switching between them is indicated in some embodiments by the NW via lower-layer signaling, e.g., DCI, or performed autonomously by the UE based on predetermined events, e.g. scheduled UL/DL data, or a timer expiring, or switching between various periods of DRX (e.g. when going from On-Duration to IAT).

In one useful example, the UE autonomously switches to the dense configuration when a scheduling PDCCH is detected and it may remain in the dense mode for a timer duration specified as part of the configuration. Upon timer expiry, if no new data has arrived, the UE switches to the sparse mode for more energy—efficient monitoring. Alternatively, the transition to the sparse mode may be signaled by the NW using e.g., DCI.

Some embodiments provide efficient mechanisms for the NW to help the UE to achieve power savings while do not sacrificing the NW performance parameters, e.g. latency, and throughput.

Certain embodiments may provide one or more of the following technical advantage(s). The UE can operate in a more energy-efficient mode during periods of IAT where no new data is arriving, while incurring only a moderate one-time latency/UPT penalty once new data is scheduled. The approach in some embodiments requires no or minimal DL signaling for more switching.

More specifically, some embodiments advantageously allow rapid transitions between different PDCCH monitoring configurations/modes, where the configurations for the modes are provided in advance and transitions are achieved with a low delay and low signaling overhead.

In some embodiments, the UE is configured with at least two PDCCH monitoring configurations via RRC for operation during various states/periods of DRX; e.g., the IAT. One mode, which may be referred to as a "dense" configuration may include SS occasions occurring every slot and permitting same-slot scheduling, as well as possibly a wider CORESET and a large set of blind decodes. Another configuration, "sparse", may include infrequent SS occasions in time domain to enable sleep periods for the UE between the monitoring slots and permit only cross-slot scheduling, so the UE can perform PDCCH monitoring using a more energy-efficient RX configuration but is guaranteed to have sufficient time to turn on PDSCH reception configuration is data is scheduled.

Switching between the modes may be indicated by the NW via lower-layer signaling. Alternatively, it may be performed autonomously by the UE based on predetermined events like e.g. scheduled UL or DL data, scheduled CSI measurement, a timer expiring, switching between various periods of DRX (e.g. when going from On-Duration to IAT), or BWP switching, or alike.

Configuration and Signaling

The multiple PDCCH monitoring mode configurations are provide to the UE via higher-layer signaling during RRC configuration/reconfiguration. For each mode, the relevant parameters may include an SS configuration (CORESET, period, offset, PDCCH format, AL, and other BD elements), cross-slot configuration (a TDRA table), mode switching signaling or other transition parameters, etc. Each mode configuration is associated with a mode index. During subsequent RRC reconfigurations, one or all modes' configurations may be modified or replaced.

Signaling to the UE to switch the mode may be done using a lightweight and fast signaling mechanism.

In one embodiment, DCI-based signaling may be used. For switching to a sparse mode, a non-scheduling DCI may be transmitted by the NW that only indicates the new monitoring mode index. Upon receiving the index, the UE uses the corresponding entry in the previous RRC configuration. The DCI may use existing DCI formats (e.g. 1-0, 1-1) where scheduling information fields may be reused for mode indication purposes, or reserved bits may be used. Alternatively, specific compact DCI formats can be developed to accommodate the switch with higher reliability than the regular PDCCH. Switching to a dense mode may be implicit in receiving a scheduling DCI (UL or DL data, or CSI measurement). Alternatively, the scheduling DCI may use additional bits (e.g. reserved bits) to indicate which of the denser modes should be invoked.

In another embodiment, MAC Control Element (CE) signaling may be used for mode switching, indicating the target monitoring mode in the command. The UE also acknowledges the reception of the command. There are currently reserved MAC CE fields which can be used for this.

In other embodiments, other types of Layer 1 (L1) indicators may be used for mode switching, e.g. predetermined reference signal (RS) sequences etc. Other examples can be receiving PDCCH in specific control resource sets (CORESETs), or based on Radio Network Temporary Identifier (RNTI).

In other embodiments, SS periodicity change can bundle with change in BWP, i.e., if the scheduling DCI indicate a change in BWP, so it does also indicate a change in SS periodicity. The same condition can apply in indication of a change in spatial domain characteristics, e.g., if the scheduling DCI indicates a change in the number of layers, so it does also indicate a change in SS periodicity. In the same way, indication of Scell activation/deactivation can be interpreted as change in SS periodicity if configured by the NW.

Event- and Timer-Based Mode Switching

In some embodiments, explicit signaling of mode switching can be omitted and switching may be performed autonomously by the UE based on predetermined events. Relevant events include e.g. receiving a scheduling PDCCH for UL or DL data, or for CSI measurement, which may be used to trigger transition to a dense monitoring in anticipation of more data or other activity. The beginning of the CDRX ON-duration may also be used as a trigger to operate in the dense mode.

Another class of events may be timers set when the UE enters a certain monitoring mode. For example, a timer may be started when a scheduling PDCCH is received and the UE enters the dense monitoring mode. When the timer expires, the UE transitions into a sparser monitoring mode. (Further levels of timers may be implemented to transition to successively sparser monitoring configurations if no scheduling/data is received.)

The signaling-based and event/timer-based switching mechanisms may also be activated simultaneously.

Example Embodiment

Figure 13:
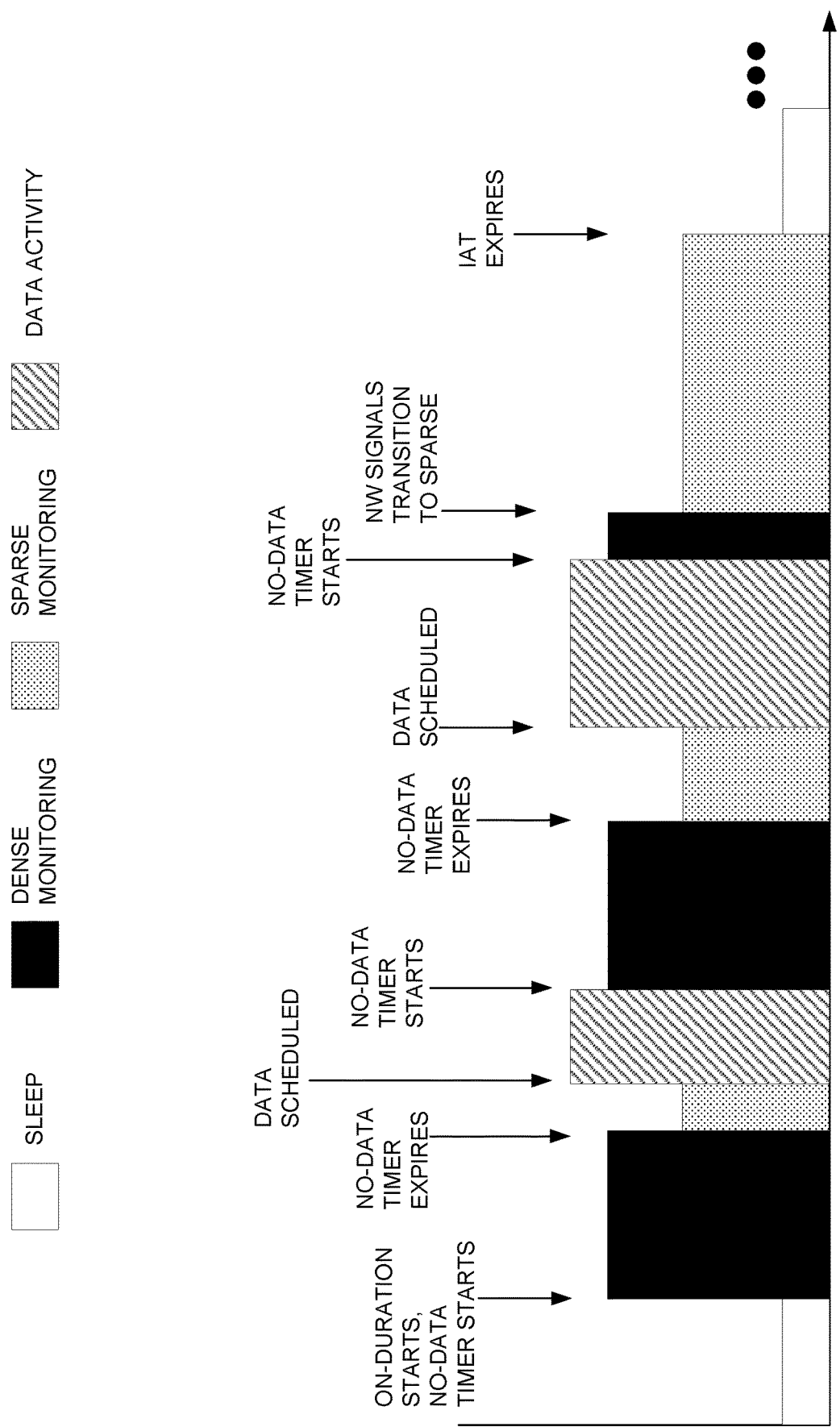
FIG. 13 is a block diagram of DRX operation according to some embodiments.

One useful example is depicted in FIG. 13. The UE is previously configured via RRC with a sparse and a dense PDCCH monitoring configuration. It autonomously switches to the dense configuration in the beginning of the CDRX on-duration when a scheduling PDCCH is detected and starts a no-data timer whose duration is specified as part of the dense configuration. It remains in the dense mode for the timer duration. Upon timer expiry, if no new data has arrived, the UE autonomously switches to the sparse mode for more energy-efficient monitoring and remains in that mode either until the IAT expires (and the UE transfers to CDRX) or new data arrives (and UE reverts to dense monitoring).

In addition, the transition to the sparse mode may be explicitly signaled by the NW using DCI signaling. The NW may preferably use the explicit signaling if it has sufficiently reliable information that no scheduling PDCCH will be transmitted to the UE in near future, e.g. based on DL buffer status, Buffer Status Report (BSR) from the UE, traffic statistics, app-level information, scheduler information (e.g. round-robin scheduling delays), etc. Upon receiving the mode switching command, the UE reconfigures its receiver for sparse PDCCH monitoring. (The signaling option may be made the only transition mechanism by setting the no-data timer to a value equal to or exceeding the IAT length.) The timeline of the embodiment is depicted in FIG. 13.

Additional Aspects

The NW-signaled transition sparse monitoring may include time parameters, e.g. a number of slots, during which the UE can remain in the sparse mode and after which it returns to the dense mode.

The NW-signaled transition to sparse monitoring has behavioral similarities to Go-To-Sleep (GTS) but has the benefit of not excluding the UE from data scheduling opportunities until the next ON-duration, only the next SS occasion.

The no-data timer based transition to sparse monitoring has behavioral similarities to IAT but, as above, it has the benefit of not excluding the UE from data scheduling opportunities until the next ON-duration, only the next SS occasion.

The same procedure can also readily extend to the case with multiple SS periodicity situations where more than two SS periodicity is configured and NW signaling or explicit signaling is used to switch between the modes.

The values of the no-data timer, as well as other parameters related to PDCCH monitoring, e.g. periodicity, can be determined by the NW based on several types information that is available in the NW, e.g. buffer status, scheduler occupancy, traffic arrival statistics, etc. It is also possible that the UE assists the NW with the UE's preferred configuration of those values, e.g. based on the running application. In this case, however, preferably the NW remains the entity which decides whether those preferred values will be used or not.

The procedure described above can also be used in combination with WUS signaling before or during ON-duration, i.e, unless WUS is received, the UE monitors PDCCH with lower SS periodicity and moves to the dense mode if WUS is received.

NW and UE Misalignment Aspects

One of the issues with the techniques leading to reduction of PDCCH monitoring instances is the possible misalignment between the NW and UE, e.g., if the UE misses the command, or indication that it should move to the dense PDCCH monitoring mode, the NW may keep sending scheduling PDCCH and does not receive a HARQ ACK/NACK from the UE. In this case, the NW and the UE become misaligned. Indeed, in the current configurations, if the NW do not receive a feedback from the UE after a few missed scheduling PDCCH, then it may assume the UE has lost the contact and does release the UE. In that case, the UE has to start connecting to the NW again which leads to additional power consumption and delay. Therefore, it is necessary to update the current procedures such that the NW and UE misalignment issues due to the change in PDCCH monitoring occasions do not lead to a total loss of connection. Below some mechanisms are provided to address this issue.

The UE misses the switch to the dense PDCCH monitoring mode or make a false alarm:

The NW can then understand that the UE has missed the move when sending the first scheduling PDCCH after the switch had to happen and notice that the UE does not provide a feedback. In this case, in one embodiment, the NW can send the scheduling PDCCH again in the next sparse PDCCH monitoring occasion that the UE would have monitored if the switch would not have happened. If the UE do not provide a feedback again, then it is up to the NW to decide whether to release the UE or try to retransmit the PDCCH again.

In a related realization of this embodiment, in case a timer based approach is used for switching either alone or combined with signaling based approaches, then the NW can take this into account when deciding to retransmitting the scheduling PDCCH. For example, if the timer expires before the next sparse PDCCH monitoring occasion and the UE is expected to switch to the dense mode in any case, then the NW can retransmit the scheduling PDCCH sooner.

Note that when the UE is in sparse mode, a false alarm to enter the dense mode does not entail a large cost for the NW, so in the worst case the UE moves to the dense mode leading to additional power consumption at the UE but there is no additional throughput loss or a whole loss of contact. In this case, in one embodiment, the UE can go back to the sparse mode if it notices that no scheduling PDCCH is received in the next instance, or if a timer based approach is used, the UE can wait till the timer expires and go back to the sparse mode. Nevertheless, in case the UE moved back to the sparse mode, it has to make sure to monitor PDCCH in the sparse monitoring occasion (MO) as the NW expect to not lead to additional misalignment.

The UE makes a false alarm or misses the switch to the sparse PDCCH monitoring mode:

If the UE misses the switch to the sparse PDCCH monitoring mode, it does not entail a large cost on the NW as far as the sparse MOs overlap with the dense MOs. As such the NW can find the UE when there is a scheduling PDCCH. However, the UE will have a higher power consumption because of dense monitoring. A timer based approach in this case is beneficial as the UE will not stay long in the dense mode, and can move to the sparse mode if no scheduling PDCCH is received. In one embodiment, the UE can also move to sparse PDCCH monitoring mode if it has noticed that it has most probably missed a switch to sparse mode (e.g., by using historical behavior of the NW). In a related realization of this embodiment, the UE can also decide to have a higher MO periodicity than the sparse one to make sure not losing the NW.

Nevertheless, if the sparse and dense MOs do not overlap, UE missing the switch to the sparse mode can be costly as the NW may not find the UE in the next MO. In this case, first the NW can discover the UE has missed the switch when sending the scheduling PDCCH and receiving no feedback from the UE. One solution is then for the NW to assume the UE has missed the switch and retransmit the scheduling PDCCH in the next dense mode MO. Again here, the NW should take the possible timer based approach into account to make sure, the UE is still in the dense mode.

In case the UE makes a false alarm and switch to the sparse PDCCH mode, it can lead to a high cost if the NW intends to schedule the UE for a traffic burst. Indeed, this case is similar to the case where the UE misses the switch to the dense mode, and thus the NW can handle it in a similar way as described above, i.e., try to retransmit the PDCCH in the next sparse MO, or in another way, transmit a signal to indicate the UE has to move back to the dense mode.

Note that in all cases, it is up to the NW first if it wants to and second for how many times it wants to retransmit the scheduling PDCCH/indication commands if the UE misses a move or makes a false alarm.

NW and UE misalignment issues for PDCCH skipping type commands:

One solution to reduce PDCCH MOs for power savings is that the NW sends a command to the UE to skip a number of PDCCH MOs if the NW is not going to schedule an UL/DL in that period. In combination with other embodiments herein or separate and apart from those other embodiments, the below constitutes some solutions to address the NW and UE misalignment in this case.

If the UE misses a PDCCH skipping command, it leads to additional power consumption, but it does not lead to a high cost at the NW side or loss of the contact. However, in case of false alarm, the UE may skip a number of PDCCH MOs which can lead to throughput loss and latency, and possibly loss of contact with the UE and thereby additional power consumption. This case is a bit more complicated to handle with respect to the NW and UE misalignment for sparse and dense mode, as in any case the NW can find the UE in another pre-configured occasion.

In one embodiment, if the number of PDCCH skipping slots/time is pre-configured, the NW can retransmit the scheduling PDCCH after these number of slots/time if it understands that the UE has most probably moved to skipping a number of PDCCH MOs.

However, if the number of slots to skip PDCCH monitoring is not pre-configured and can be signaled dynamically by the NW, then one robust approach is that the NW take the maximum possible number of slots into account, and retransmit the PDCCH in that MO to make sure being able to find the UE. Furthermore, in this case, it is up to the NW to decide if and how many times it wants to retransmit the PDCCH if the UE keeps missing it.

Configuration of Sparse and Dense Modes

The configuration of sparse monitoring mode may typically include a periodicity of a number of slots, and an indication of one or more slots that should be monitored within each period. The dense monitoring mode can, as the alternative suggested in the brief summary, correspond to monitoring each slot, but can also be configured with a periodicity and offset/pattern within the period. Typically, the duty-cycle of the monitored slots is higher in the dense mode than for the sparse.

As discussed in the section above about misalignment aspects, recovery from misalignments may be better if the dense and sparse MO overlap, i.e., the sparse MO is a subset of the dense MO.

On the contrary, when multiple UEs operate in sparse mode, there are not as many occasions to schedule each UE, and the blocking probability may increase. To limit the blocking probability, different UEs could be configured with non-overlapping sparse MO. Which slot(s) to use within each period can either be configured over RRC, or be calculated as a function of the UE index or C-RNTI.

For some examples, see FIG. 5. A: Dense MO in every slot; sparse in every $2^{nd}$. B and C: Dense and sparse with different duty cycles, and overlapping slots. D: Non-overlapping sparse MO for different UEs.

Instead of configuration with slots, configuration could be done in minislots, or other time units.

Figure 14:
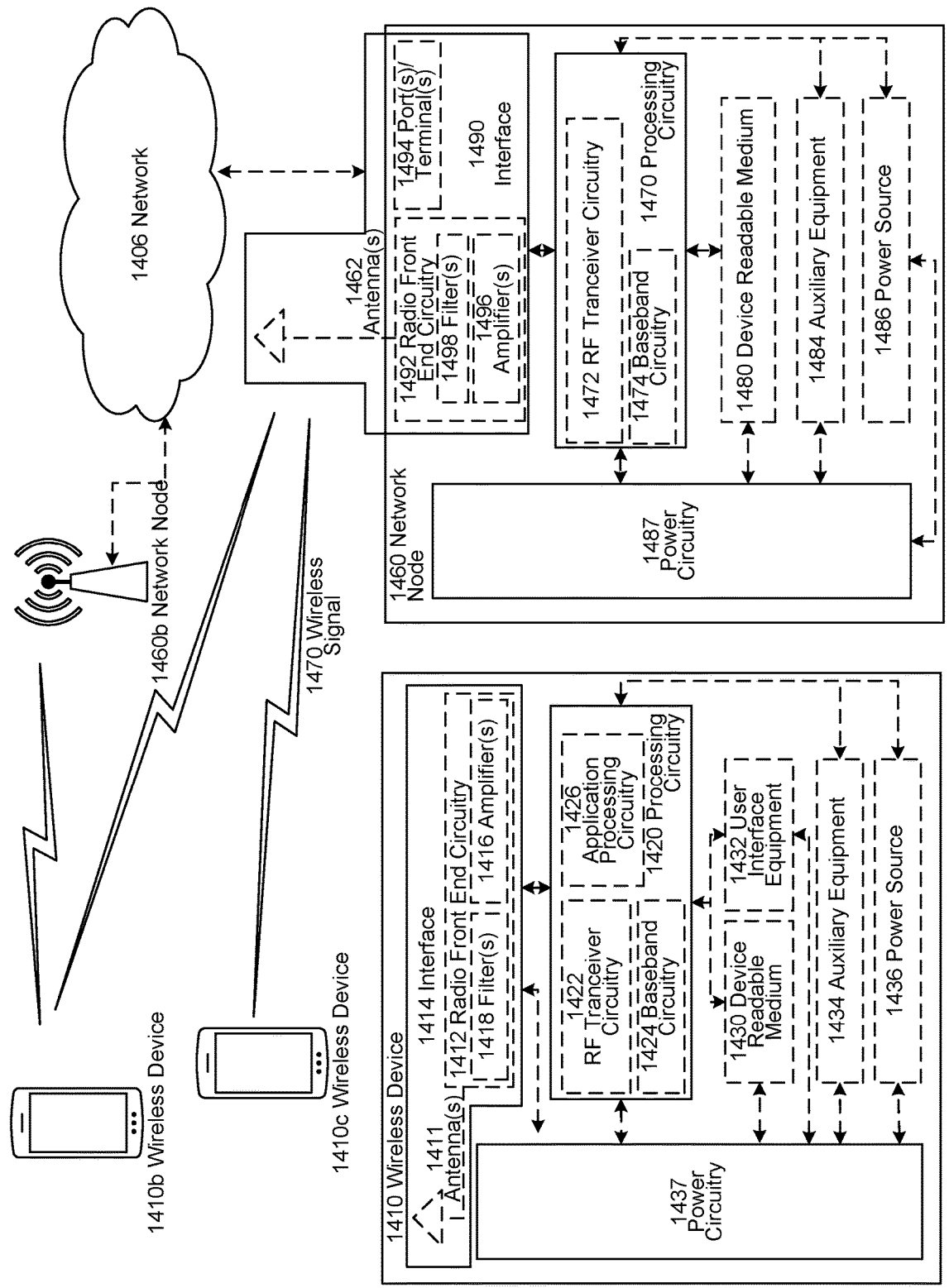
FIG. 14 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460b, and WDs 1410, 1410b, and 1410c. In practice, a wireless network may further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1460 are depicted as single boxes located within a larger box, or nested within multiple boxes, in practice, a network node may comprise multiple different physical components that make up a single illustrated component (e.g., device readable medium 1480 may comprise multiple separate hard drives as well as multiple RAM modules).

Similarly, network node 1460 may be composed of multiple physically separate components (e.g., a NodeB component and a RNC component, or a BTS component and a BSC component, etc.), which may each have their own respective components. In certain scenarios in which network node 1460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1460 may be configured to support multiple radio access technologies (RATs). In such embodiments, some components may be duplicated (e.g., separate device readable medium 1480 for the different RATs) and some components may be reused (e.g., the same antenna 1462 may be shared by the RATs). Network node 1460 may also include multiple sets of the various illustrated components for different wireless technologies integrated into network node 1460, such as, for example, GSM, WCDMA, LTE, NR, WiFi, or Bluetooth wireless technologies. These wireless technologies may be integrated into the same or different chip or set of chips and other components within network node 1460.

Processing circuitry 1470 is configured to perform any determining, calculating, or similar operations (e.g., certain obtaining operations) described herein as being provided by a network node. These operations performed by processing circuitry 1470 may include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 may execute instructions stored in device readable medium 1480 or in memory within processing circuitry 1470. Such functionality may include providing any of the various wireless features, functions, or benefits discussed herein. In some embodiments, processing circuitry 1470 may include a system on a chip (SOC).

In some embodiments, processing circuitry 1470 may include one or more of radio frequency (RF) transceiver circuitry 1472 and baseband processing circuitry 1474. In some embodiments, radio frequency (RF) transceiver circuitry 1472 and baseband processing circuitry 1474 may be on separate chips (or sets of chips), boards, or units, such as radio units and digital units. In alternative embodiments, part or all of RF transceiver circuitry 1472 and baseband processing circuitry 1474 may be on the same chip or set of chips, boards, or units In certain embodiments, some or all of the functionality described herein as being provided by a network node, base station, eNB or other such network device may be performed by processing circuitry 1470 executing instructions stored on device readable medium 1480 or memory within processing circuitry 1470. In alternative embodiments, some or all of the functionality may be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1470. Device readable medium 1480 may store any suitable instructions, data or information, including a computer program, software, an application including one or more of logic, rules, code, tables, etc. and/or other instructions capable of being executed by processing circuitry 1470 and, utilized by network node 1460. Device readable medium 1480 may be used to store any calculations made by processing circuitry 1470 and/or any data received via interface 1490. In some embodiments, processing circuitry 1470 and device readable medium 1480 may be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that may be coupled to, or in certain embodiments a part of, antenna 1462. Radio front end circuitry 1492 comprises filters 1498 and amplifiers 1496. Radio front end circuitry 1492 may be connected to antenna 1462 and processing circuitry 1470. Radio front end circuitry may be configured to condition signals communicated between antenna 1462 and processing circuitry 1470. Radio front end circuitry 1492 may receive digital data that is to be sent out to other network nodes or WDs via a wireless connection. Radio front end circuitry 1492 may convert the digital data into a radio signal having the appropriate channel and bandwidth parameters using a combination of filters 1498 and/or amplifiers 1496. The radio signal may then be transmitted via antenna 1462. Similarly, when receiving data, antenna 1462 may collect radio signals which are then converted into digital data by radio front end circuitry 1492. The digital data may be passed to processing circuitry 1470. In other embodiments, the interface may comprise different components and/or different combinations of components.

In certain alternative embodiments, network node 1460 may not include separate radio front end circuitry 1492, instead, processing circuitry 1470 may comprise radio front end circuitry and may be connected to antenna 1462 without separate radio front end circuitry 1492. Similarly, in some embodiments, all or some of RF transceiver circuitry 1472 may be considered a part of interface 1490. In still other embodiments, interface 1490 may include one or more ports or terminals 1494, radio front end circuitry 1492, and RF transceiver circuitry 1472, as part of a radio unit (not shown), and interface 1490 may communicate with baseband processing circuitry 1474, which is part of a digital unit (not shown).

Antenna 1462 may include one or more antennas, or antenna arrays, configured to send and/or receive wireless signals. Antenna 1462 may be coupled to radio front end circuitry 1490 and may be any type of antenna capable of transmitting and receiving data and/or signals wirelessly. In some embodiments, antenna 1462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1462 may be separate from network node 1460 and may be connectable to network node 1460 through an interface or port.

Antenna 1462, interface 1490, and/or processing circuitry 1470 may be configured to perform any receiving operations and/or certain obtaining operations described herein as being performed by a network node. Any information, data and/or signals may be received from a wireless device, another network node and/or any other network equipment. Similarly, antenna 1462, interface 1490, and/or processing circuitry 1470 may be configured to perform any transmitting operations described herein as being performed by a network node. Any information, data and/or signals may be transmitted to a wireless device, another network node and/or any other network equipment.

Power circuitry 1487 may comprise, or be coupled to, power management circuitry and is configured to supply the components of network node 1460 with power for performing the functionality described herein. Power circuitry 1487 may receive power from power source 1486. Power source 1486 and/or power circuitry 1487 may be configured to provide power to the various components of network node 1460 in a form suitable for the respective components (e.g., at a voltage and current level needed for each respective component). Power source 1486 may either be included in, or external to, power circuitry 1487 and/or network node 1460. For example, network node 1460 may be connectable to an external power source (e.g., an electricity outlet) via an input circuitry or interface such as an electrical cable, whereby the external power source supplies power to power circuitry 1487. As a further example, power source 1486 may comprise a source of power in the form of a battery or battery pack which is connected to, or integrated in, power circuitry 1487. The battery may provide backup power should the external power source fail. Other types of power sources, such as photovoltaic devices, may also be used.

Alternative embodiments of network node 1460 may include additional components beyond those shown in FIG. 14 that may be responsible for providing certain aspects of the network node's functionality, including any of the functionality described herein and/or any functionality necessary to support the subject matter described herein. For example, network node 1460 may include user interface equipment to allow input of information into network node 1460 and to allow output of information from network node 1460. This may allow a user to perform diagnostic, maintenance, repair, and other administrative functions for network node 1460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 may include multiple sets of one or more of the illustrated components for different wireless technologies supported by WD 1410, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1410.

Antenna 1411 may include one or more antennas or antenna arrays, configured to send and/or receive wireless signals, and is connected to interface 1414. In certain alternative embodiments, antenna 1411 may be separate from WD 1410 and be connectable to WD 1410 through an interface or port. Antenna 1411, interface 1414, and/or processing circuitry 1420 may be configured to perform any receiving or transmitting operations described herein as being performed by a WD. Any information, data and/or signals may be received from a network node and/or another WD. In some embodiments, radio front end circuitry and/or antenna 1411 may be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and is configured to condition signals communicated between antenna 1411 and processing circuitry 1420. Radio front end circuitry 1412 may be coupled to or a part of antenna 1411. In some embodiments, WD 1410 may not include separate radio front end circuitry 1412; rather, processing circuitry 1420 may comprise radio front end circuitry and may be connected to antenna 1411. Similarly, in some embodiments, some or all of RF transceiver circuitry 1422 may be considered a part of interface 1414. Radio front end circuitry 1412 may receive digital data that is to be sent out to other network nodes or WDs via a wireless connection. Radio front end circuitry 1412 may convert the digital data into a radio signal having the appropriate channel and bandwidth parameters using a combination of filters 1418 and/or amplifiers 1416. The radio signal may then be transmitted via antenna 1411. Similarly, when receiving data, antenna 1411 may collect radio signals which are then converted into digital data by radio front end circuitry 1412. The digital data may be passed to processing circuitry 1420. In other embodiments, the interface may comprise different components and/or different combinations of components.

Processing circuitry 1420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality may include providing any of the various wireless features or benefits discussed herein. For example, processing circuitry 1420 may execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry may comprise different components and/or different combinations of components. In certain embodiments processing circuitry 1420 of WD 1410 may comprise a SOC. In some embodiments, RF transceiver circuitry 1422, baseband processing circuitry 1424, and application processing circuitry 1426 may be on separate chips or sets of chips. In alternative embodiments, part or all of baseband processing circuitry 1424 and application processing circuitry 1426 may be combined into one chip or set of chips, and RF transceiver circuitry 1422 may be on a separate chip or set of chips. In still alternative embodiments, part or all of RF transceiver circuitry 1422 and baseband processing circuitry 1424 may be on the same chip or set of chips, and application processing circuitry 1426 may be on a separate chip or set of chips. In yet other alternative embodiments, part or all of RF transceiver circuitry 1422, baseband processing circuitry 1424, and application processing circuitry 1426 may be combined in the same chip or set of chips. In some embodiments, RF transceiver circuitry 1422 may be a part of interface 1414. RF transceiver circuitry 1422 may condition RF signals for processing circuitry 1420.

In certain embodiments, some or all of the functionality described herein as being performed by a WD may be provided by processing circuitry 1420 executing instructions stored on device readable medium 1430, which in certain embodiments may be a computer-readable storage medium. In alternative embodiments, some or all of the functionality may be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 may be configured to perform any determining, calculating, or similar operations (e.g., certain obtaining operations) described herein as being performed by a WD. These operations, as performed by processing circuitry 1420, may include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 may be operable to store a computer program, software, an application including one or more of logic, rules, code, tables, etc. and/or other instructions capable of being executed by processing circuitry 1420. Device readable medium 1430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1420. In some embodiments, processing circuitry 1420 and device readable medium 1430 may be considered to be integrated.

User interface equipment 1432 may provide components that allow for a human user to interact with WD 1410. Such interaction may be of many forms, such as visual, audial, tactile, etc. User interface equipment 1432 may be operable to produce output to the user and to allow the user to provide input to WD 1410. The type of interaction may vary depending on the type of user interface equipment 1432 installed in WD 1410. For example, if WD 1410 is a smart phone, the interaction may be via a touch screen; if WD 1410 is a smart meter, the interaction may be through a screen that provides usage (e.g., the number of gallons used) or a speaker that provides an audible alert (e.g., if smoke is detected). User interface equipment 1432 may include input interfaces, devices and circuits, and output interfaces, devices and circuits. User interface equipment 1432 is configured to allow input of information into WD 1410, and is connected to processing circuitry 1420 to allow processing circuitry 1420 to process the input information. User interface equipment 1432 may include, for example, a microphone, a proximity or other sensor, keys/buttons, a touch display, one or more cameras, a USB port, or other input circuitry. User interface equipment 1432 is also configured to allow output of information from WD 1410, and to allow processing circuitry 1420 to output information from WD 1410. User interface equipment 1432 may include, for example, a speaker, a display, vibrating circuitry, a USB port, a headphone interface, or other output circuitry. Using one or more input and output interfaces, devices, and circuits, of user interface equipment 1432, WD 1410 may communicate with end users and/or the wireless network, and allow them to benefit from the functionality described herein.

Auxiliary equipment 1434 is operable to provide more specific functionality which may not be generally performed by WDs. This may comprise specialized sensors for doing measurements for various purposes, interfaces for additional types of communication such as wired communications etc. The inclusion and type of components of auxiliary equipment 1434 may vary depending on the embodiment and/or scenario.

Power source 1436 may, in some embodiments, be in the form of a battery or battery pack. Other types of power sources, such as an external power source (e.g., an electricity outlet), photovoltaic devices or power cells, may also be used. WD 1410 may further comprise power circuitry 1437 for delivering power from power source 1436 to the various parts of WD 1410 which need power from power source 1436 to carry out any functionality described or indicated herein. Power circuitry 1437 may in certain embodiments comprise power management circuitry. Power circuitry 1437 may additionally or alternatively be operable to receive power from an external power source; in which case WD 1410 may be connectable to the external power source (such as an electricity outlet) via input circuitry or an interface such as an electrical power cable. Power circuitry 1437 may also in certain embodiments be operable to deliver power from an external power source to power source 1436. This may be, for example, for the charging of power source 1436. Power circuitry 1437 may perform any formatting, converting, or other modification to the power from power source 1436 to make the power suitable for the respective components of WD 1410 to which power is supplied.

Figure 15:
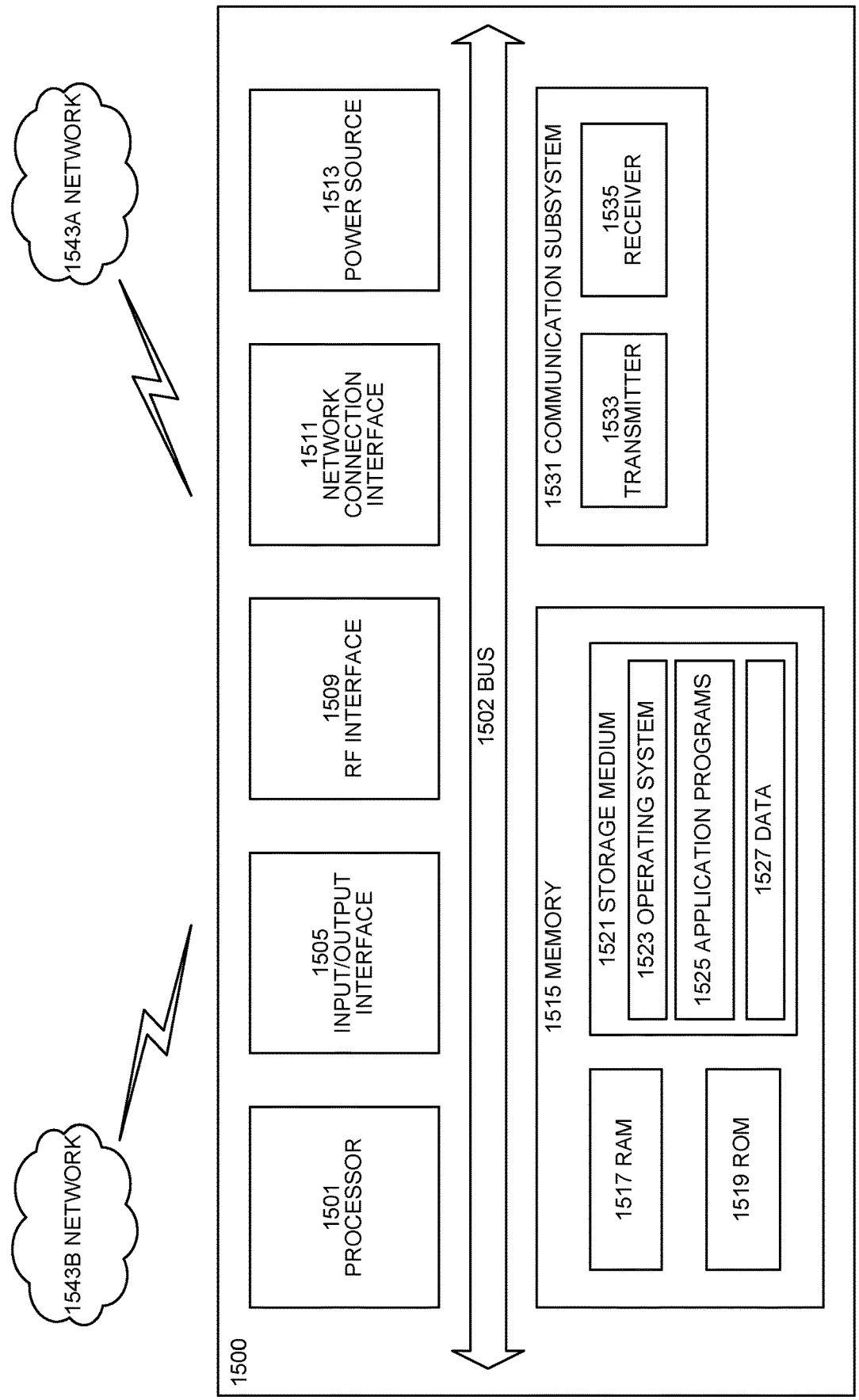
FIG. 15 is a block diagram of a user equipment according to some embodiments.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 15200 may be any UE identified by the 3$^{rd}$ Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry 1501 may be configured to process computer instructions and data. Processing circuitry 1501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 may include two central processing units (CPUs). Data may be information in a form suitable for use by a computer.

In the depicted embodiment, input/output interface 1505 may be configured to provide a communication interface to an input device, output device, or input and output device. UE 1500 may be configured to use an output device via input/output interface 1505. An output device may use the same type of interface port as an input device. For example, a USB port may be used to provide input to and output from UE 1500. The output device may be a speaker, a sound card, a video card, a display, a monitor, a printer, an actuator, an emitter, a smartcard, another output device, or any combination thereof. UE 1500 may be configured to use an input device via input/output interface 1505 to allow a user to capture information into UE 1500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 1509 may be configured to provide a communication interface to RF components such as a transmitter, a receiver, and an antenna. Network connection interface 1511 may be configured to provide a communication interface to network 1543*a*. Network 1543*a* may encompass wired and/or wireless networks such as a local-area network (LAN), a wide-area network (WAN), a computer network, a wireless network, a telecommunications network, another like network or any combination thereof. For example, network 1543*a* may comprise a Wi-Fi network. Network connection interface 1511 may be configured to include a receiver and a transmitter interface used to communicate with one or more other devices over a communication network according to one or more communication protocols, such as Ethernet, TCP/IP, SONET, ATM, or the like. Network connection interface 1511 may implement receiver and transmitter functionality appropriate to the communication network links (e.g., optical, electrical, and the like). The transmitter and receiver functions may share circuit components, software or firmware, or alternatively may be implemented separately.

RAM 1517 may be configured to interface via bus 1502 to processing circuitry 1501 to provide storage or caching of data or computer instructions during the execution of software programs such as the operating system, application programs, and device drivers. ROM 1519 may be configured to provide computer instructions or data to processing circuitry 1501. For example, ROM 1519 may be configured to store invariant low-level system code or data for basic system functions such as basic input and output (I/O), startup, or reception of keystrokes from a keyboard that are stored in a non-volatile memory. Storage medium 1521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 may be configured to include operating system 1523, application program 1525 such as a web browser application, a widget or gadget engine or another application, and data file 1527. Storage medium 1521 may store, for use by UE 1500, any of a variety of various operating systems or combinations of operating systems.

Storage medium 1521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 may allow UE 1500 to access computer-executable instructions, application programs or the like, stored on transitory or non-transitory memory media, to off-load data, or to upload data. An article of manufacture, such as one utilizing a communication system may be tangibly embodied in storage medium 1521, which may comprise a device readable medium.

In FIG. 15, processing circuitry 1501 may be configured to communicate with network 1543*b* using communication subsystem 1531. Network 1543*a* and network 1543*b* may be the same network or networks or different network or networks. Communication subsystem 1531 may be configured to include one or more transceivers used to communicate with network 1543*b*. For example, communication subsystem 1531 may be configured to include one or more transceivers used to communicate with one or more remote transceivers of another device capable of wireless communication such as another WD, UE, or base station of a radio access network (RAN) according to one or more communication protocols, such as IEEE 802.15, CDMA, WCDMA, GSM, LTE, UTRAN, WiMax, or the like. Each transceiver may include transmitter 1533 and/or receiver 1535 to implement transmitter or receiver functionality, respectively, appropriate to the RAN links (e.g., frequency allocations and the like). Further, transmitter 1533 and receiver 1535 of each transceiver may share circuit components, software or firmware, or alternatively may be implemented separately.

In the illustrated embodiment, the communication functions of communication subsystem 1531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 may include cellular communication, Wi-Fi communication, Bluetooth communication, and GPS communication. Network 1543*b* may encompass wired and/or wireless networks such as a local-area network (LAN), a wide-area network (WAN), a computer network, a wireless network, a telecommunications network, another like network or any combination thereof. For example, network 1543*b* may be a cellular network, a W-Fi network, and/or a near-field network. Power source 1513 may be configured to provide alternating current (AC) or direct current (DC) power to components of UE 1500.

The features, benefits and/or functions described herein may be implemented in one of the components of UE 1500 or partitioned across multiple components of UE 1500. Further, the features, benefits, and/or functions described herein may be implemented in any combination of hardware, software or firmware. In one example, communication subsystem 1531 may be configured to include any of the components described herein. Further, processing circuitry 1501 may be configured to communicate with any of such components over bus 1502. In another example, any of such components may be represented by program instructions stored in memory that when executed by processing circuitry 1501 perform the corresponding functions described herein. In another example, the functionality of any of such components may be partitioned between processing circuitry 1501 and communication subsystem 1531. In another example, the non-computationally intensive functions of any of such components may be implemented in software or firmware and the computationally intensive functions may be implemented in hardware.

Figure 16:
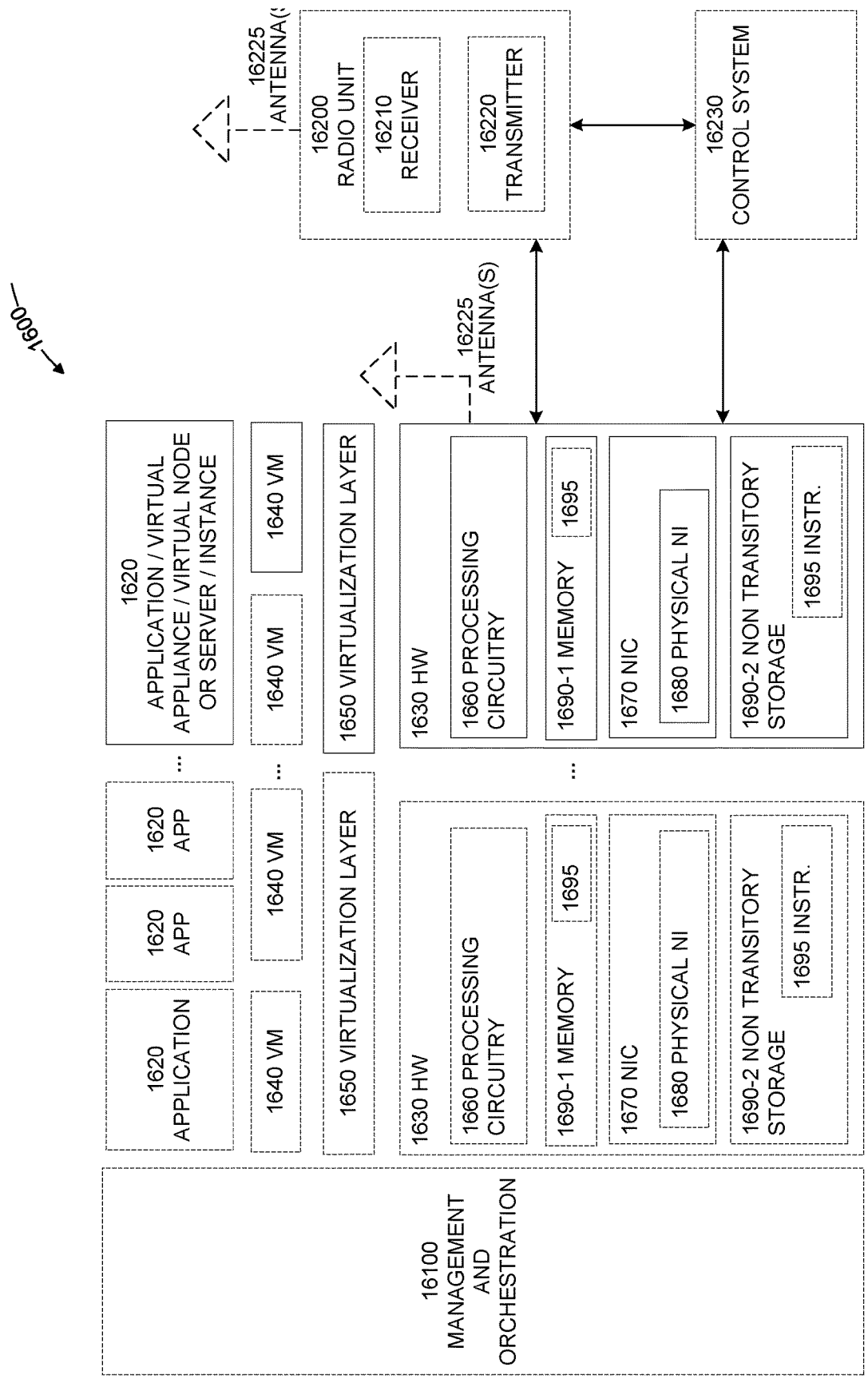
FIG. 16 is a block diagram of a virtualization environment according to some embodiments.

FIG. 16 is a schematic block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node may be entirely virtualized.

The functions may be implemented by one or more applications 1620 (which may alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which may be commercial off-the-shelf (COTS) processors, dedicated Application Specific Integrated Circuits (ASICs), or any other type of processing circuitry including digital or analog hardware components or special purpose processors. Each hardware device may comprise memory 1690-1 which may be non-persistent memory for temporarily storing instructions 1695 or software executed by processing circuitry 1660. Each hardware device may comprise one or more network interface controllers (NICs) 1670, also known as network interface cards, which include physical network interface 1680. Each hardware device may also include non-transitory, persistent, machine-readable storage media 1690-2 having stored therein software 1695 and/or instructions executable by processing circuitry 1660. Software 1695 may include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and may be run by a corresponding virtualization layer 1650 or hypervisor. Different embodiments of the instance of virtual appliance 1620 may be implemented on one or more of virtual machines 1640, and the implementations may be made in different ways.

During operation, processing circuitry 1660 executes software 1695 to instantiate the hypervisor or virtualization layer 1650, which may sometimes be referred to as a virtual machine monitor (VMM). Virtualization layer 1650 may present a virtual operating platform that appears like networking hardware to virtual machine 1640.

As shown in FIG. 16, hardware 1630 may be a standalone network node with generic or specific components. Hardware 1630 may comprise antenna 16225 and may implement some functions via virtualization. Alternatively, hardware 1630 may be part of a larger cluster of hardware (e.g. such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1640 may be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 may be coupled to one or more antennas 16225. Radio units 16200 may communicate directly with hardware nodes 1630 via one or more appropriate network interfaces and may be used in combination with the virtual components to provide a virtual node with radio capabilities, such as a radio access node or a base station.

In some embodiments, some signalling can be effected with the use of control system 16230 which may alternatively be used for communication between the hardware nodes 1630 and radio units 16200.

Figure 17:
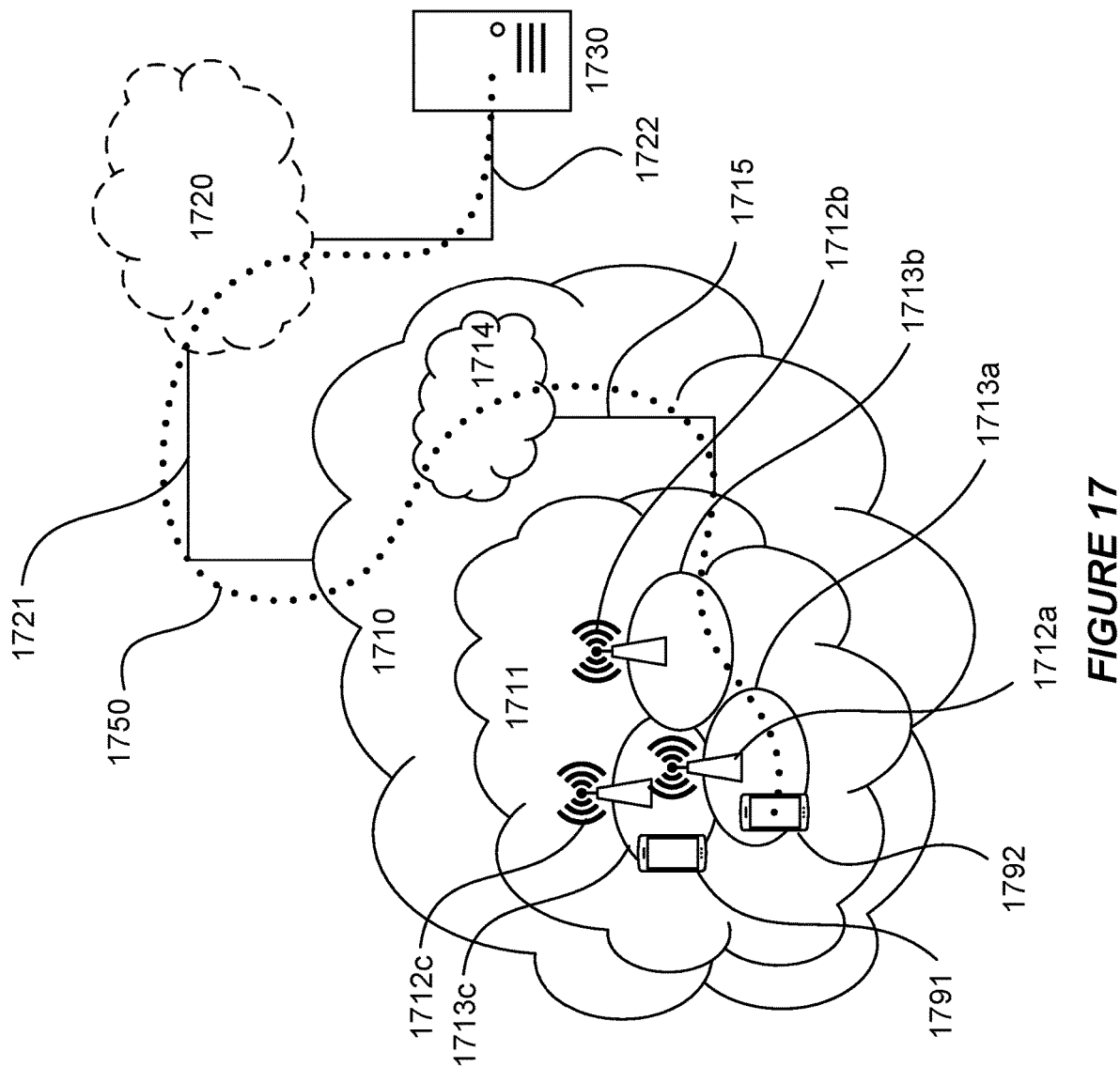
FIG. 17 is a block diagram of a communication network with a host computer according to some embodiments.

FIG. 17 illustrates a telecommunication network connected via an intermediate network to a host computer in accordance with some embodiments. In particular, with reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712*a*, 1712*b*, 1712*c*, such as NBs, eNBs, gNBs or other types of wireless access points, each defining a corresponding coverage area 1713*a*, 1713*b*, 1713*c*. Each base station 1712*a*, 1712*b*, 1712*c* is connectable to core network 1714 over a wired or wireless connection 1715. A first UE 1791 located in coverage area 1713*c* is configured to wirelessly connect to, or be paged by, the corresponding base station 1712*c*. A second UE 1792 in coverage area 1713*a* is wirelessly connectable to the corresponding base station 1712*a*. While a plurality of UEs 1791, 1792 are illustrated in this example, the disclosed embodiments are equally applicable to a situation where a sole UE is in the coverage area or where a sole UE is connecting to the corresponding base station 1712.

Telecommunication network 1710 is itself connected to host computer 1730, which may be embodied in the hardware and/or software of a standalone server, a cloud-implemented server, a distributed server or as processing resources in a server farm. Host computer 1730 may be under the ownership or control of a service provider, or may be operated by the service provider or on behalf of the service provider. Connections 1721 and 1722 between telecommunication network 1710 and host computer 1730 may extend directly from core network 1714 to host computer 1730 or may go via an optional intermediate network 1720. Intermediate network 1720 may be one of, or a combination of more than one of, a public, private or hosted network; intermediate network 1720, if any, may be a backbone network or the Internet; in particular, intermediate network 1720 may comprise two or more sub-networks (not shown).

The communication system of FIG. 17 as a whole enables connectivity between the connected UEs 1791, 1792 and host computer 1730. The connectivity may be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 may be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Figure 18:
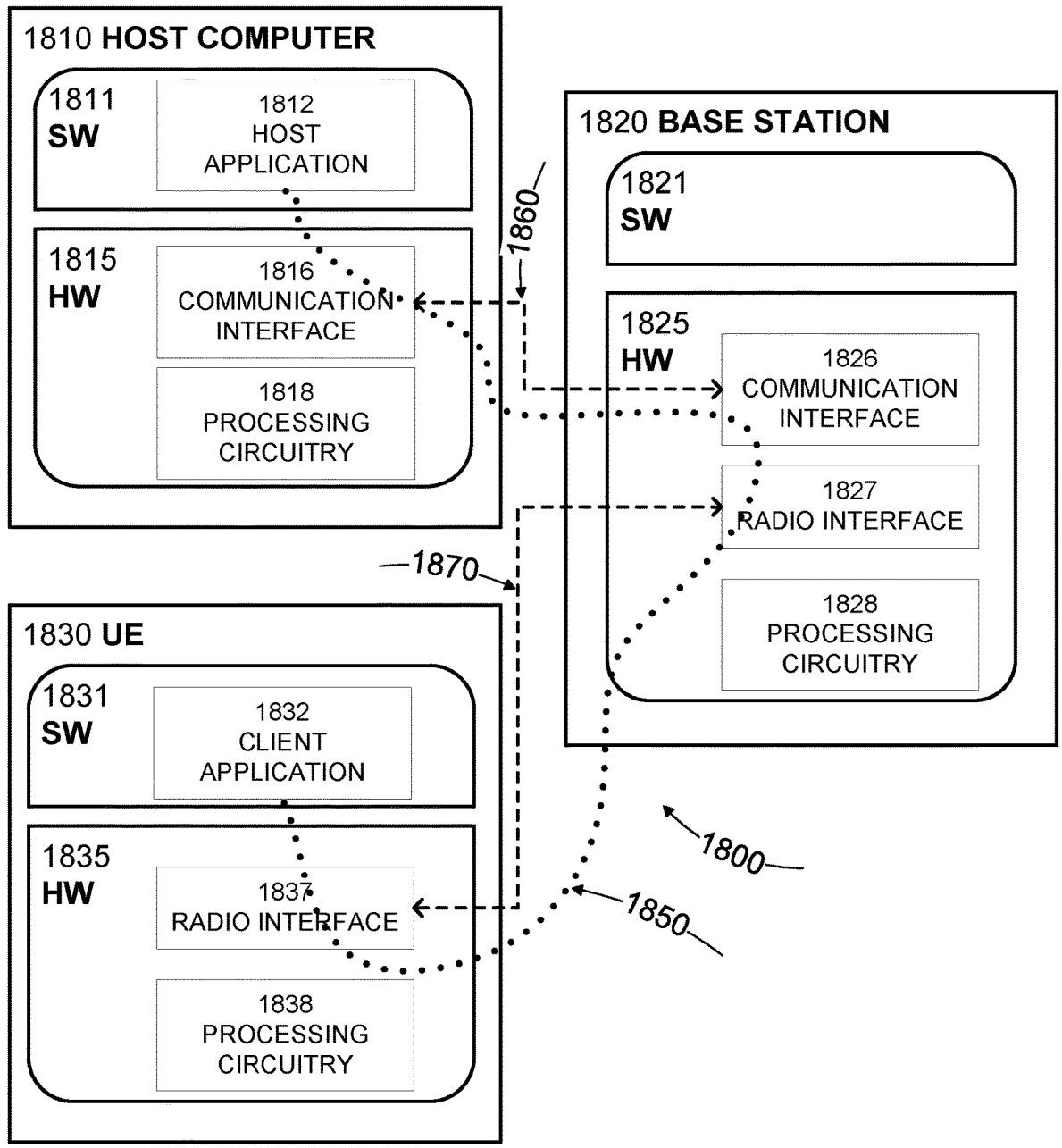
FIG. 18 is a block diagram of a host computer according to some embodiments.

Example implementations, in accordance with an embodiment, of the UE, base station and host computer discussed in the preceding paragraphs will now be described with reference to FIG. 18. FIG. 18 illustrates host computer communicating via a base station with a user equipment over a partially wireless connection in accordance with some embodiments In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which may have storage and/or processing capabilities. In particular, processing circuitry 1818 may comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 may be operable to provide a service to a remote user, such as UE 1830 connecting via OTT connection 1850 terminating at UE 1830 and host computer 1810. In providing the service to the remote user, host application 1812 may provide user data which is transmitted using OTT connection 1850.

Communication system 1800 further includes base station 1820 provided in a telecommunication system and comprising hardware 1825 enabling it to communicate with host computer 1810 and with UE 1830. Hardware 1825 may include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 may be configured to facilitate connection 1860 to host computer 1810. Connection 1860 may be direct or it may pass through a core network (not shown in FIG. 18) of the telecommunication system and/or through one or more intermediate networks outside the telecommunication system. In the embodiment shown, hardware 1825 of base station 1820 further includes processing circuitry 1828, which may comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 further includes UE 1830 already referred to. Its hardware 1835 may include radio interface 1837 configured to set up and maintain wireless connection 1870 with a base station serving a coverage area in which UE 1830 is currently located. Hardware 1835 of UE 1830 further includes processing circuitry 1838, which may comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 may be operable to provide a service to a human or non-human user via UE 1830, with the support of host computer 1810. In host computer 1810, an executing host application 1812 may communicate with the executing client application 1832 via OTT connection 1850 terminating at UE 1830 and host computer 1810. In providing the service to the user, client application 1832 may receive request data from host application 1812 and provide user data in response to the request data. OTT connection 1850 may transfer both the request data and the user data. Client application 1832 may interact with the user to generate the user data that it provides.

It is noted that host computer 1810, base station 1820 and UE 1830 illustrated in FIG. 18 may be similar or identical to host computer 1730, one of base stations 1712a, 1712b, 1712c and one of UEs 1791, 1792 of FIG. 17, respectively. This is to say, the inner workings of these entities may be as shown in FIG. 18 and independently, the surrounding network topology may be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure may determine the routing, which it may be configured to hide from UE 1830 or from the service provider operating host computer 1810, or both. While OTT connection 1850 is active, the network infrastructure may further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment.

A measurement procedure may be provided for the purpose of monitoring data rate, latency and other factors on which the one or more embodiments improve. There may further be an optional network functionality for reconfiguring OTT connection 1850 between host computer 1810 and UE 1830, in response to variations in the measurement results. The measurement procedure and/or the network functionality for reconfiguring OTT connection 1850 may be implemented in software 1811 and hardware 1815 of host computer 1810 or in software 1831 and hardware 1835 of UE 1830, or both. In embodiments, sensors (not shown) may be deployed in or in association with communication devices through which OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of OTT connection 1850 may include message format, retransmission settings, preferred routing etc.; the reconfiguring need not affect base station 1820, and it may be unknown or imperceptible to base station 1820. Such procedures and functionalities may be known and practiced in the art. In certain embodiments, measurements may involve proprietary UE signaling facilitating host computer 1810's measurements of throughput, propagation times, latency and the like. The measurements may be implemented in that software 1811 and 1831 causes messages to be transmitted, in particular empty or 'dummy' messages, using OTT connection 1850 while it monitors propagation times, errors etc.

Figure 19:
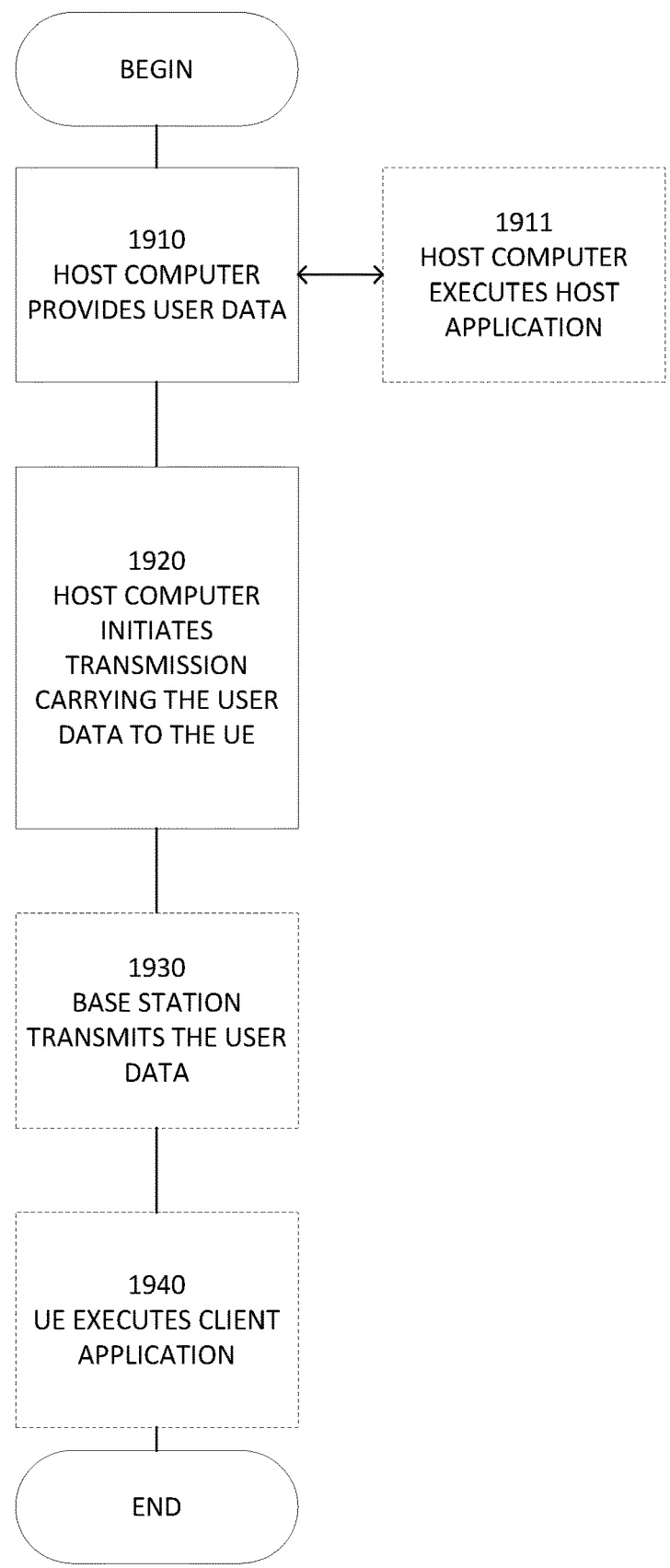
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step 1910, the host computer provides user data. In substep 1911 (which may be optional) of step 1910, the host computer provides the user data by executing a host application. In step 1920, the host computer initiates a transmission carrying the user data to the UE. In step 1930 (which may be optional), the base station transmits to the UE the user data which was carried in the transmission that the host computer initiated, in accordance with the teachings of the embodiments described throughout this disclosure. In step 1940 (which may also be optional), the UE executes a client application associated with the host application executed by the host computer.

Figure 20:
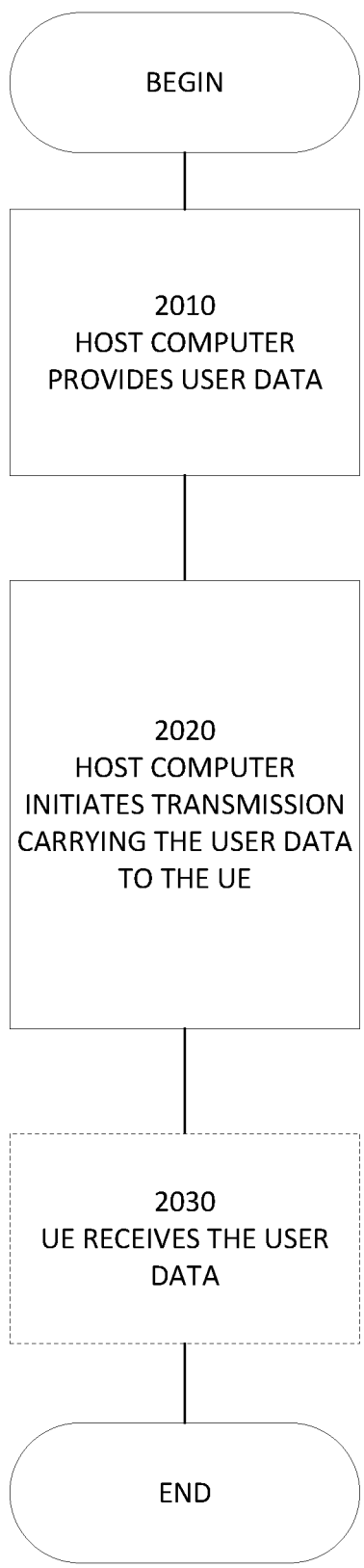
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step 2010 of the method, the host computer provides user data. In an optional substep (not shown) the host computer provides the user data by executing a host application. In step 2020, the host computer initiates a transmission carrying the user data to the UE. The transmission may pass via the base station, in accordance with the teachings of the embodiments described throughout this disclosure. In step 2030 (which may be optional), the UE receives the user data carried in the transmission.

Figure 21:
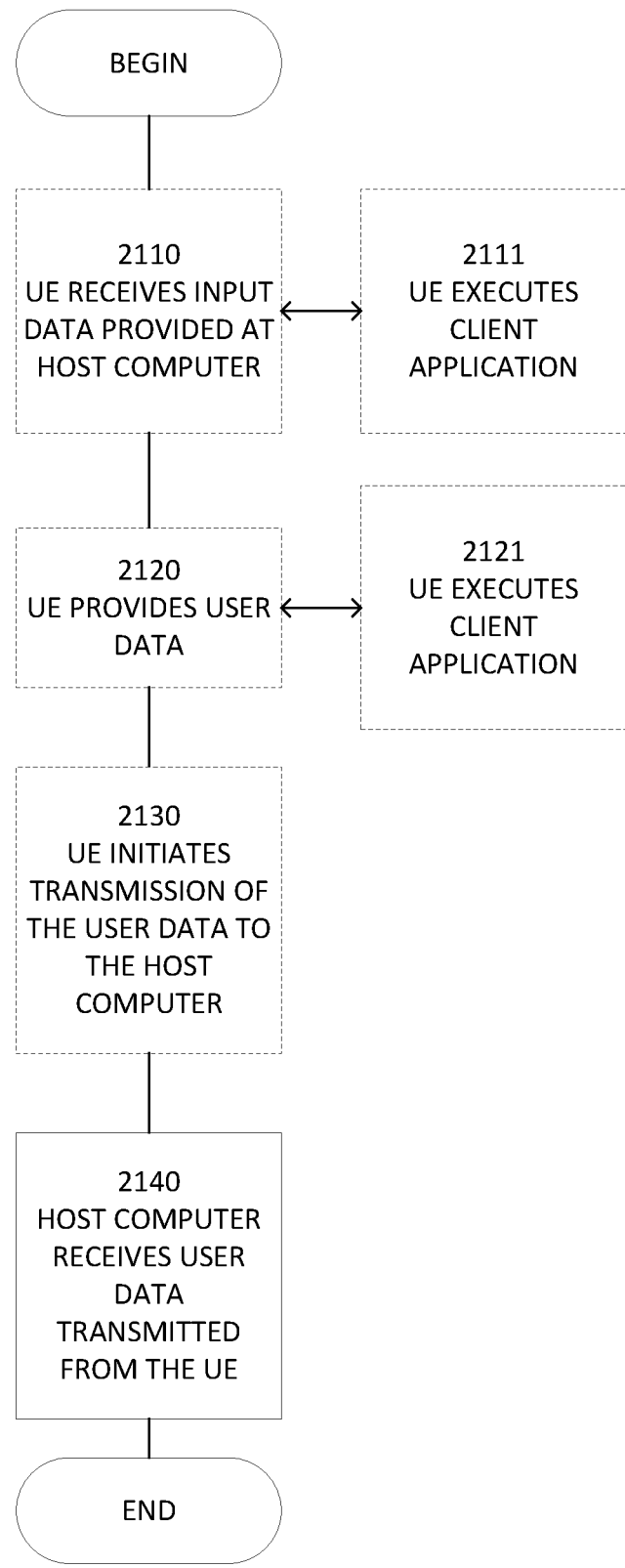
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step 2110 (which may be optional), the UE receives input data provided by the host computer. Additionally or alternatively, in step 2120, the UE provides user data. In substep 2121 (which may be optional) of step 2120, the UE provides the user data by executing a client application. In substep 2111 (which may be optional) of step 2110, the UE executes a client application which provides the user data in reaction to the received input data provided by the host computer. In providing the user data, the executed client application may further consider user input received from the user. Regardless of the specific manner in which the user data was provided, the UE initiates, in substep 2130 (which may be optional), transmission of the user data to the host computer. In step 2140 of the method, the host computer receives the user data transmitted from the UE, in accordance with the teachings of the embodiments described throughout this disclosure.

Figure 22:
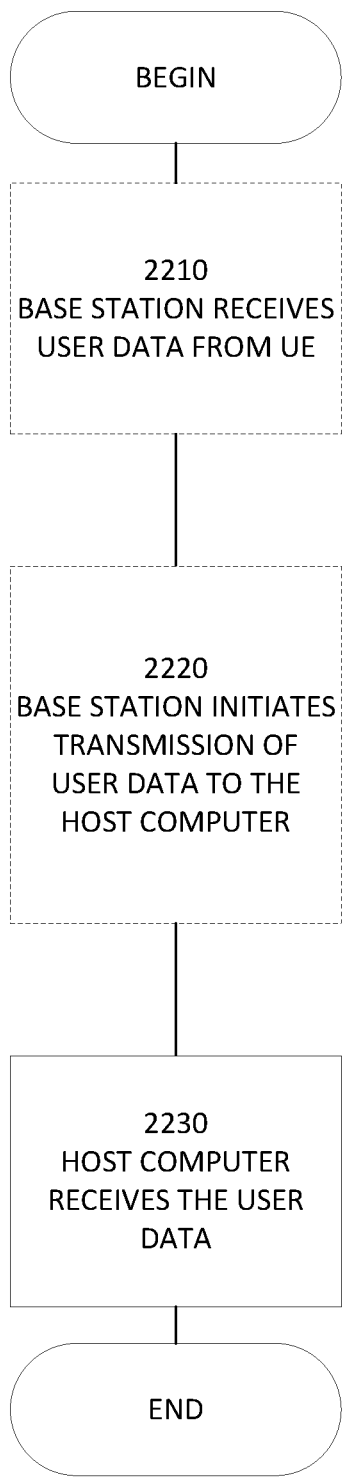
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step 2210 (which may be optional), in accordance with the teachings of the embodiments described throughout this disclosure, the base station receives user data from the UE. In step 2220 (which may be optional), the base station initiates transmission of the received user data to the host computer. In step 2230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Example embodiments of the techniques and apparatus described herein include, but are not limited to, the following enumerated examples:

Group A Examples

A1. A method performed by a wireless device, the method comprising:
receiving, from a network node, signaling (26) that indicates one or more of multiple different control channel monitoring configurations usable by the wireless device for monitoring a control channel during an active time of discontinuous reception, DRX, operation.

A2. A method performed by a wireless device, the method comprising:
receiving, from a network node, signaling (13) that indicates which of multiple different control channel monitoring configurations the wireless device is to use for monitoring a control channel during an active time of discontinuous reception, DRX, operation.

A3. The method of any of examples A1-A2, further comprising monitoring the control channel during the active time of DRX operation using one or more of the multiple different control channel monitoring configurations.

A4. The method of example A3, wherein said monitoring comprises monitoring the control channel during different intervals, portions, or stages of the active time using different respective ones of the multiple different control channel monitoring configurations.

A5. A method performed by a wireless device, the method comprising:
monitoring a control channel during different intervals, portions, or stages of an active time of discontinuous reception, DRX, operation using different respective ones of multiple different control channel monitoring configurations.

A6. The method of any of examples A1-A5, further comprising, during the active time, switching from monitoring the control channel using one of the control channel monitoring configurations to monitoring the control channel using a different one of the control channel monitoring configurations.

A7. The method of example A6, wherein said switching is triggered by signaling (13) received from the network node.

A8. The method of example A6, wherein said switching is triggered by occurrence of an event.

A9. The method of example A8, wherein said event is expiration of a timer.

A10. The method of any of examples A1-A9, wherein the different control channel monitoring configurations respectively configure different densities of monitoring occasions within which the wireless device is to monitor the control channel during the active time of DRX operation.

A11. The method of any of examples A1-A10, wherein the different control channel monitoring configurations respectively configure the wireless device to monitor different frequencies, channels, frequency regions, or bandwidth parts.

A12. The method of any of examples A1-A11, wherein the different control channel monitoring configurations respectively configure different sets of identifiers with which the wireless device is to decode control messages received on the control channel during the active time of DRX operation.

AA. The method of any of the previous examples, further comprising:
providing user data; and
forwarding the user data to a host computer via the transmission to a base station.

Group B Examples

B1. A method performed by a network node, the method comprising:
transmitting, from the network node to a wireless device, signaling (26) that indicates one or more of multiple different control channel monitoring configurations usable by the wireless device for monitoring a control channel during an active time of discontinuous reception, DRX, operation.

B2. A method performed by a network node, the method comprising:
transmitting, from the network node to a wireless device, signaling (13) that indicates which of multiple different control channel monitoring configurations the wireless device is to use for monitoring a control channel during an active time of discontinuous reception, DRX, operation.

B3. The method of any of examples B1-B2, further comprising scheduling transmission of a control message on the control channel for the wireless device, based on with which of the multiple different control channel monitoring configurations the wireless device is monitoring the control channel.

B4. The method of any of examples B1-B3, further comprising determining which of the multiple different control channel monitoring configurations the wireless device is to use for monitoring the control channel during the active time.

B5. A method performed by a network node, the method comprising:
scheduling transmission of a control message on a control channel for a wireless device, based on with which of multiple different control channel monitoring configurations the wireless device is monitoring the control channel during an active time of discontinuous reception, DRX, operation.

B6. The method of any of examples B1-B5, wherein the different control channel monitoring configurations respectively configure different densities of monitoring occasions within which the wireless device is to monitor the control channel during the active time of DRX operation.

B7. The method of any of examples B1-B6, wherein the different control channel monitoring configurations respectively configure the wireless device to monitor different frequencies, channels, frequency regions, or bandwidth parts.

B8. The method of any of examples B1-B7, wherein the different control channel monitoring configurations respectively configure different sets of identifiers with which the wireless device is to decode control messages received on the control channel during the active time of DRX operation.

BB. The method of any of the previous examples, further comprising:
  obtaining user data; and
  forwarding the user data to a host computer or a wireless device.

Group C Examples

C1. A wireless device configured to perform any of the steps of any of the Group A examples.

C2. A wireless device comprising processing circuitry configured to perform any of the steps of any of the Group A examples.

C3. A wireless device comprising:
  communication circuitry; and
  processing circuitry configured to perform any of the steps of any of the Group A examples.

C4. A wireless device comprising:
  processing circuitry configured to perform any of the steps of any of the Group A examples; and
  power supply circuitry configured to supply power to the wireless device.

C5. A wireless device comprising:
  processing circuitry and memory, the memory containing instructions executable by the processing circuitry whereby the wireless device is configured to perform any of the steps of any of the Group A examples.

C6. A user equipment (UE) comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the Group A examples;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.

C7. A computer program comprising instructions which, when executed by at least one processor of a wireless device, causes the wireless device to carry out the steps of any of the Group A examples.

C8. A carrier containing the computer program of example C7, wherein the carrier is one of an electronic signal, optical signal, radio signal, or computer readable storage medium.

C9. A network node configured to perform any of the steps of any of the Group B examples.

C10. A network node comprising processing circuitry configured to perform any of the steps of any of the Group B examples.

C11. A network node comprising:
  communication circuitry; and
  processing circuitry configured to perform any of the steps of any of the Group B examples.

C12. A network node comprising:
  processing circuitry configured to perform any of the steps of any of the Group B examples;
  power supply circuitry configured to supply power to the network node.

C13. A network node comprising:
  processing circuitry and memory, the memory containing instructions executable by the processing circuitry whereby the network node is configured to perform any of the steps of any of the Group B examples.

C14. The network node of any of examples C9-C13, wherein the network node is a base station.

C15. A computer program comprising instructions which, when executed by at least one processor of a network node, causes the network node to carry out the steps of any of the Group B examples.

C16. The computer program of example C14, wherein the network node is a base station.

C17. A carrier containing the computer program of any of examples C15-C16, wherein the carrier is one of an electronic signal, optical signal, radio signal, or computer readable storage medium.

Group D Examples

D1. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of the Group B examples.

D2. The communication system of the previous example further including the base station.

D3. The communication system of the previous 2 examples, further including the UE, wherein the UE is configured to communicate with the base station.

D4. The communication system of the previous 3 examples, wherein:
  the processing circuitry of the host computer is configured to execute a host application, thereby providing the user data; and
  the UE comprises processing circuitry configured to execute a client application associated with the host application.

D5. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps of any of the Group B examples.

D6. The method of the previous example, further comprising, at the base station, transmitting the user data.

D7. The method of the previous 2 examples, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 examples.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A examples.

D10. The communication system of the previous example, wherein the cellular network further includes a base station configured to communicate with the UE.

D11. The communication system of the previous 2 examples, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A examples.

D13. The method of the previous example, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A examples.

D15. The communication system of the previous example, further including the UE.

D16. The communication system of the previous 2 examples, further including the base station, wherein the base station comprises a radio interface configured to communicate with the UE and a communication interface configured to forward to the host computer the user data carried by a transmission from the UE to the base station.

D17. The communication system of the previous 3 examples, wherein:
the processing circuitry of the host computer is configured to execute a host application; and
the UE's processing circuitry is configured to execute a client application associated with the host application, thereby providing the user data.

D18. The communication system of the previous 4 examples, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A examples.

D20. The method of the previous example, further comprising, at the UE, providing the user data to the base station.

D21. The method of the previous 2 examples, further comprising:
at the UE, executing a client application, thereby providing the user data to be transmitted; and
at the host computer, executing a host application associated with the client application.

D22. The method of the previous 3 examples, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B examples.

D24. The communication system of the previous example further including the base station.

D25. The communication system of the previous 2 examples, further including the UE, wherein the UE is configured to communicate with the base station.

D26. The communication system of the previous 3 examples, wherein:
the processing circuitry of the host computer is configured to execute a host application;
the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A examples.

D28. The method of the previous example, further comprising at the base station, receiving the user data from the UE.

D29. The method of the previous 2 examples, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
3GPP 3rd Generation Partnership Project
5G 5th Generation
BB Baseband BW Bandwidth
/CDRX Connected mode DRX (i.e. DRX in RRC_CO-NNECTED state)
CRC Cyclic Redundancy Check
DCI Downlink Control Information
DL Downlink
DRX Discontinuous Reception
gNB A radio base station in 5G/NR.
HARQ Hybrid Automatic Repeat Request
IoT Internet of Things
LO Local Oscillator
LTE Long Term Evolution
MAC Medium Access Control
MCS Modulation and Coding Scheme
mMTC massive MTC (referring to scenarios with ubiquitously deployed MTC devices)
ms millisecond
MTC Machine Type Communication
NB Narrowband
NB-IoT Narrowband Internet of Things
NR New Radio
NW Network
PDCCH Physical Downlink Control Channel
PDSCH Physical Downlink Shared Channel
RF Radio Frequency
RNTI Radio Network Temporary Identifier
RRC Radio Resource Control
RX Receiver/Reception
SSB Synchronization Signal Block
T/F Time/Frequency
TX Transmitter/Transmission
UE User Equipment
UL Uplink
WU Wake-up
WUG Wake-up Group
WUR Wake-up Radio/Wake-up Receiver
WUS Wake-up Signal/Wake-up Signaling
1×RTT CDMA2000 1× Radio Transmission Technology
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DM Demodulation
DMRS Demodulation Reference Signal
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HO Handover
HSPA High Speed Packet Access
HRPD High Rate Packet Data
LOS Line of Sight
LPP LTE Positioning Protocol
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDP Profile Delay Profile
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method performed by a wireless device, the method comprising:
    during a first portion of an active time of discontinuous reception (DRX) operation, monitoring a control channel using a first control channel monitoring configuration;
    during the active time, switching from the first control channel monitoring configuration to a second control channel monitoring configuration, wherein said switching is triggered by a non-scheduling downlink control information (DCI) message that does not schedule any transmission but indicates an index of the second control channel monitoring configuration to which the wireless device is to switch; and
    during a second portion of the active time occurring subsequent to the first portion and after said switching, monitoring the control channel using the second control channel monitoring configuration, wherein the first portion of the active time and the second portion of the active time are included in the same DRX cycle.

2. The method of claim 1, further comprising receiving, from a network node, radio resource control (RRC) signaling that indicates the second control channel monitoring configuration usable by the wireless device for monitoring the control channel during the active time and that further indicates the index of the second control channel monitoring configuration.

3. A method performed by a network node, the method comprising:
    transmitting, from the network node to a wireless device, signaling that configures the wireless device to, upon receiving a non-scheduling downlink control information (DCI) message that does not schedule any transmission but indicates an index of a second control channel monitoring configuration to which the wireless device is to switch, switch from monitoring a control channel during a first portion of an active time of discontinuous reception (DRX) operation using a first control channel monitoring configuration to monitoring the control channel during a second portion of the active time using the second control channel monitoring configuration, wherein the first portion of the active time and the second portion of the active time are included in the same DRX cycle.

4. A wireless device comprising:
    communication circuitry; and
    processing circuitry configured to:
        during a first portion of an active time of discontinuous reception (DRX) operation, monitor a control channel using a first control channel monitoring configuration;
        during the active time, switch from the first control channel monitoring configuration to a second control channel monitoring configuration, wherein said switching is triggered by a non-scheduling downlink control information (DCI) message that does not schedule any transmission but indicates an index of the second control channel monitoring configuration to which the wireless device is to switch; and
        during a second portion of the active time occurring subsequent to the first portion and after said switching, monitor the control channel using the second control channel monitoring configuration, wherein the first portion of the active time and the second portion of the active time are included in the same DRX cycle.

5. A network node comprising:
    communication circuitry; and
    processing circuitry configured to transmit, from the network node to a wireless device, signaling that configures the wireless device to, upon receiving a non-scheduling downlink control information (DCI) message that does not schedule any transmission but indicates an index of a second control channel monitoring configuration to which the wireless device is to switch, switch from monitoring a control channel during a first portion of an active time of discontinuous reception (DRX) operation using a first control channel monitoring configuration to monitoring the control channel during a second portion of the active time using the second control channel monitoring configuration, wherein the first portion of the active time and the second portion of the active time are included in the same DRX cycle.

6. The method of claim 1, wherein the first portion of the active time and the second portion of the active time are contiguous in time.

7. The method of claim 3, wherein the first portion of the active time and the second portion of the active time are contiguous in time.

8. The method of claim 3, wherein the signaling indicates at least one of the first and the second control channel monitoring configurations.

9. The wireless device of claim 4, the processing circuitry further being configured to receive, from a network node, signaling that indicates at least one of the first and the second control channel monitoring configurations usable by the wireless device for monitoring the control channel during the active time.

10. The network node of claim 5, wherein the first portion of the active time and the second portion of the active time are contiguous in time.

11. The network node of claim 5, wherein the signaling indicates at least one of the first and the second control channel monitoring configurations.

12. The method of claim 1, wherein the non-scheduling DCI message has a format with a field dedicated to indicating a monitoring configuration to which the wireless device is to switch.

13. The method of claim 1, wherein the second control channel monitoring configuration configures the wireless device to monitor the control channel more sparsely in time than the first control channel monitoring configuration.

14. The method of claim 1, wherein the first and second control channel monitoring configurations are first and second search space configurations that have first and second search space periodicities for monitoring the control channel.

15. The method of claim 1, further comprising:
during the active time, switching from the second control channel monitoring configuration to a third control channel monitoring configuration, wherein switching to the third control channel monitoring configuration is triggered by a scheduling DCI message that schedules a transmission for the wireless device; and
during a third portion of the active time occurring subsequent to the second portion, monitoring the control channel using the third control channel monitoring configuration, wherein the first portion, the second portion, and the third portion of the active time are included in the same DRX cycle.

16. The method of claim 15, further comprising:
during the active time, switching from the third control channel monitoring configuration to a fourth control channel monitoring configuration, wherein switching to the fourth control channel monitoring configuration is triggered by occurrence of an event, wherein the event is expiration of a timer; and
during a fourth portion of the active time occurring subsequent to the third portion, monitoring the control channel using the third control channel monitoring configuration, wherein the first portion, the second portion, the third portion, and the fourth portion of the active time are included in the same DRX cycle.

17. The method of claim 3, further comprising transmitting, from the network node to the wireless device, signaling that configures the wireless device to, upon occurrence of an event, switch from monitoring the control channel during a third portion of the active time of DRX operation using a third control channel monitoring configuration to monitoring the control channel during a fourth portion of the active time using a fourth control channel monitoring configuration, wherein the first portion, the second portion, the third portion, and the fourth portion of the active time are included in the same DRX cycle, wherein said event is expiration of a timer.

18. The wireless device of claim 4, the processing circuitry further configured to:
during the active time, switch from the second control channel monitoring configuration to a third control channel monitoring configuration, wherein switching to the third control channel monitoring configuration is triggered by a scheduling DCI message that schedules a transmission for the wireless device; and
during a third portion of the active time occurring subsequent to the second portion, monitor the control channel using the third control channel monitoring configuration, wherein the first portion, the second portion, and the third portion of the active time are included in the same DRX cycle.

19. The wireless device of claim 18, the processing circuitry further configured to:
during the active time, switch from the third control channel monitoring configuration to a fourth control channel monitoring configuration, wherein switching to the fourth control channel monitoring configuration is triggered by occurrence of an event, wherein the event is expiration of a timer; and
during a fourth portion of the active time occurring subsequent to the third portion, monitor the control channel using the third control channel monitoring configuration, wherein the first portion, the second portion, the third portion, and the fourth portion of the active time are included in the same DRX cycle.

20. The network node of claim 5, the processing circuitry further configured to transmit, from the network node to the wireless device, signaling that configures the wireless device to, upon occurrence of an event, switch from monitoring the control channel during a third portion of the active time of DRX operation using a third control channel monitoring configuration to monitoring the control channel during a fourth portion of the active time using a fourth control channel monitoring configuration, wherein the first portion, the second portion, the third portion, and the fourth portion of the active time are included in the same DRX cycle, wherein said event is expiration of a timer.

21. The wireless device of claim 4, wherein the non-scheduling DCI message has a format with a field dedicated to indicating a monitoring configuration to which the wireless device is to switch.

22. The method of claim 16, wherein said event is expiration of the timer while an inactivity timer for DRX operation is running.

23. The method of claim 22, wherein the timer is set to be shorter in duration than the inactivity timer.

24. The method of claim 16, further comprising starting the timer when the wireless device starts monitoring the control channel using the third control channel monitoring configuration.

25. The method of claim 16, further comprising receiving, from a network node, signaling indicating a value of the timer.

26. The method of claim 25, wherein the value of the timer indicates a duration for which the wireless device is permitted to monitor the control channel using the third control channel monitoring configuration and after which the wireless device is to switch to using the fourth control channel monitoring configuration.

27. The method of claim 16, further comprising, while monitoring the control channel using the third control channel monitoring configuration, monitoring for a command to switch to using the fourth control channel monitoring configuration, and wherein said switching comprises, responsive to the timer expiring without the wireless device having received the command, switching from the third control channel monitoring configuration to the fourth control channel monitoring configuration.

28. The method of claim 17, wherein the signaling configures the wireless device with a value of the timer.

29. The wireless device of claim 19, wherein said event is expiration of the timer while an inactivity timer for DRX operation is running.

30. The wireless device of claim 29, wherein the timer is set to be shorter in duration than the inactivity timer.

31. The wireless device of claim 19, the processing circuitry further being configured to start the timer when the wireless device starts monitoring the control channel using the third control channel monitoring configuration.

32. The wireless device of claim 19, the processing circuitry further being configured to receive, from a network node, signaling indicating a value of the timer.

33. The wireless device of claim 32, wherein the value of the timer indicates a duration for which the wireless device is permitted to monitor the control channel using the third control channel monitoring configuration and after which the wireless device is to switch to using the fourth control channel monitoring configuration.

34. The wireless device of claim 19, the processing circuitry further being configured to, while monitoring the control channel using the third control channel monitoring configuration, monitor for a command to switch to using the fourth control channel monitoring configuration, and wherein said switching comprises, responsive to the timer expiring without the wireless device having received the command, switching from the third control channel monitoring configuration to the fourth control channel monitoring configuration.

35. The network node of claim 20, wherein the signaling configures the wireless device with a value of the timer.

* * * * *